US009753285B2

(12) United States Patent
Imoto et al.

(10) Patent No.: US 9,753,285 B2
(45) Date of Patent: Sep. 5, 2017

(54) INFORMATION PROCESSING DEVICE, NOTIFICATION STATE CONTROL METHOD, AND PROGRAM

(71) Applicant: SONY CORPORATION, Tokyo (JP)

(72) Inventors: Maki Imoto, Tokyo (JP); Atsushi Izumihara, Tokyo (JP); Koji Ihara, Chiba (JP); Shigeru Kawada, Chiba (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 14/773,787

(22) PCT Filed: Feb. 20, 2014

(86) PCT No.: PCT/JP2014/054046
§ 371 (c)(1),
(2) Date: Sep. 9, 2015

(87) PCT Pub. No.: WO2014/156388
PCT Pub. Date: Oct. 2, 2014

(65) Prior Publication Data
US 2016/0018655 A1     Jan. 21, 2016

(30) Foreign Application Priority Data
Mar. 29, 2013   (JP) .................................. 2013-074830

(51) Int. Cl.
G02B 27/01    (2006.01)
G06F 3/01    (2006.01)

(52) U.S. Cl.
CPC ....... *G02B 27/0172* (2013.01); *G02B 27/017* (2013.01); *G06F 3/011* (2013.01); *G06F 3/013* (2013.01); *G02B 2027/014* (2013.01); *G02B 2027/0132* (2013.01); *G02B 2027/0138* (2013.01); *G02B 2027/0141* (2013.01)

(58) Field of Classification Search
CPC .............. G02B 27/0172; G02B 27/017; G02B 27/0093; G02B 27/0035; G06F 3/011; G06F 3/013; G09G 3/3611
USPC ........................................................... 345/8
See application file for complete search history.

(56) References Cited

U.S. PATENT DOCUMENTS

| | | | | |
|---|---|---|---|---|
| 6,050,717 A * | 4/2000 | Kosugi et al. | ....... | G05B 19/409 345/214 |
| 9,341,843 B2 * | 5/2016 | Border et al. | ..... | G02B 27/0093 |
| 9,366,862 B2 * | 6/2016 | Haddick et al. | ... | G02B 27/0093 |

(Continued)

OTHER PUBLICATIONS

Oct. 14, 2016, EP communication issued for related EP application No. 14775684.5.

*Primary Examiner* — Fred Tzeng
(74) *Attorney, Agent, or Firm* — Paratus Law Group, PLLC

(57) ABSTRACT

Provided is an information processing device to enable a user and an outside person to communicate smoothly, the information processing device including: a necessity degree determination unit configured to determine, based on outside information indicating a situation external to a user, a degree of necessity that the user be notified of the outside information; and a notification state control unit configured to switch a notification state of the outside information with respect to the user based on the determined degree of necessity.

19 Claims, 19 Drawing Sheets

(56) References Cited

U.S. PATENT DOCUMENTS

| | | | |
|---|---|---|---|
| 2002/0196202 A1* | 12/2002 | Bastian et al. | G02B 27/017 345/8 |
| 2003/0210228 A1* | 11/2003 | Ebersole et al. | G02B 27/017 345/157 |
| 2009/0033588 A1* | 2/2009 | Kajita et al. | G02B 27/017 345/2.3 |
| 2010/0079356 A1 | 4/2010 | Hoellwarth | |
| 2012/0050044 A1* | 3/2012 | Border et al. | A61M 21/02 340/573.1 |
| 2012/0050140 A1* | 3/2012 | Border et al. | G02B 6/0035 345/8 |
| 2012/0050143 A1* | 3/2012 | Border et al. | G09G 3/3611 345/8 |
| 2012/0050493 A1* | 3/2012 | Ernst et al. | G02B 27/017 348/47 |
| 2012/0062444 A1* | 3/2012 | Cok et al. | G02B 27/0172 345/8 |
| 2012/0154277 A1* | 6/2012 | Bar-Zeev et al. | G02B 27/017 345/158 |
| 2014/0232651 A1* | 8/2014 | Kress et al. | G02B 27/0172 345/158 |

* cited by examiner

FIG.3

|  | PERSON APPROACHING | PERSON SPEAKING | SPECIFIC GESTURE | INTER-DEVICE COMMUNICATION |
|---|---|---|---|---|
| ACQUAINTANCE | INTERMEDIATE | HIGH | HIGH | INTERMEDIATE |
| STRANGER | LOW | HIGH | HIGH | LOW |

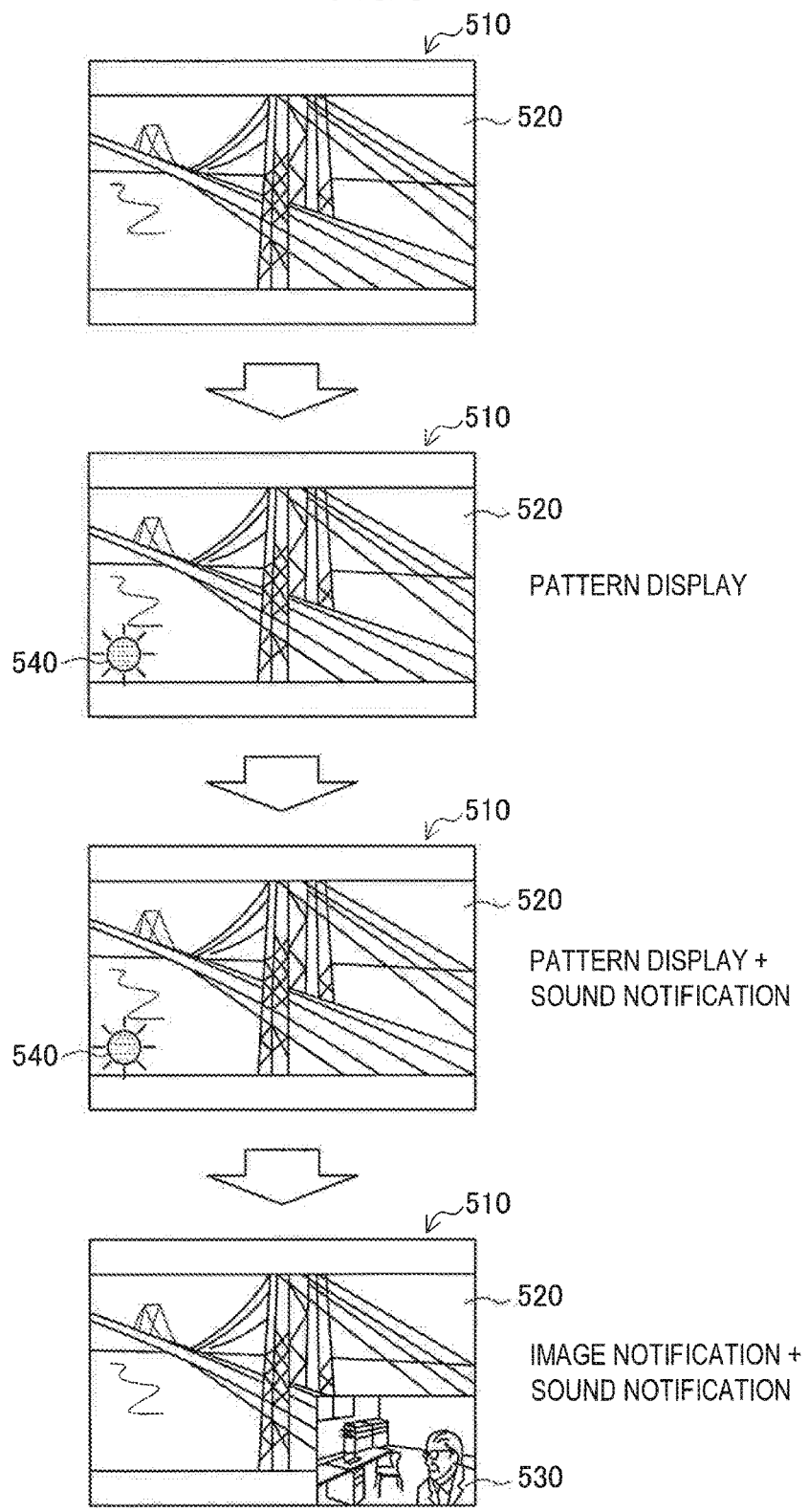

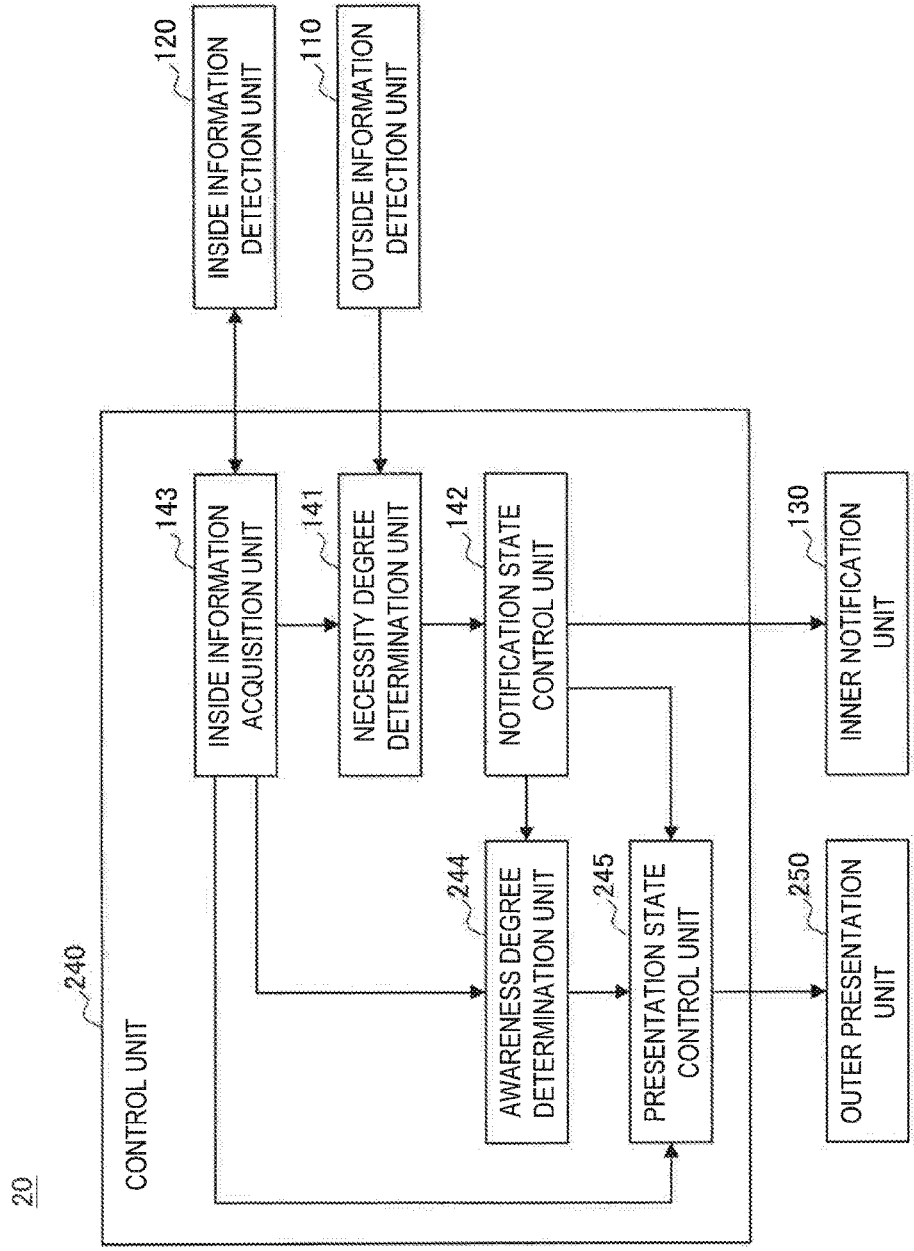

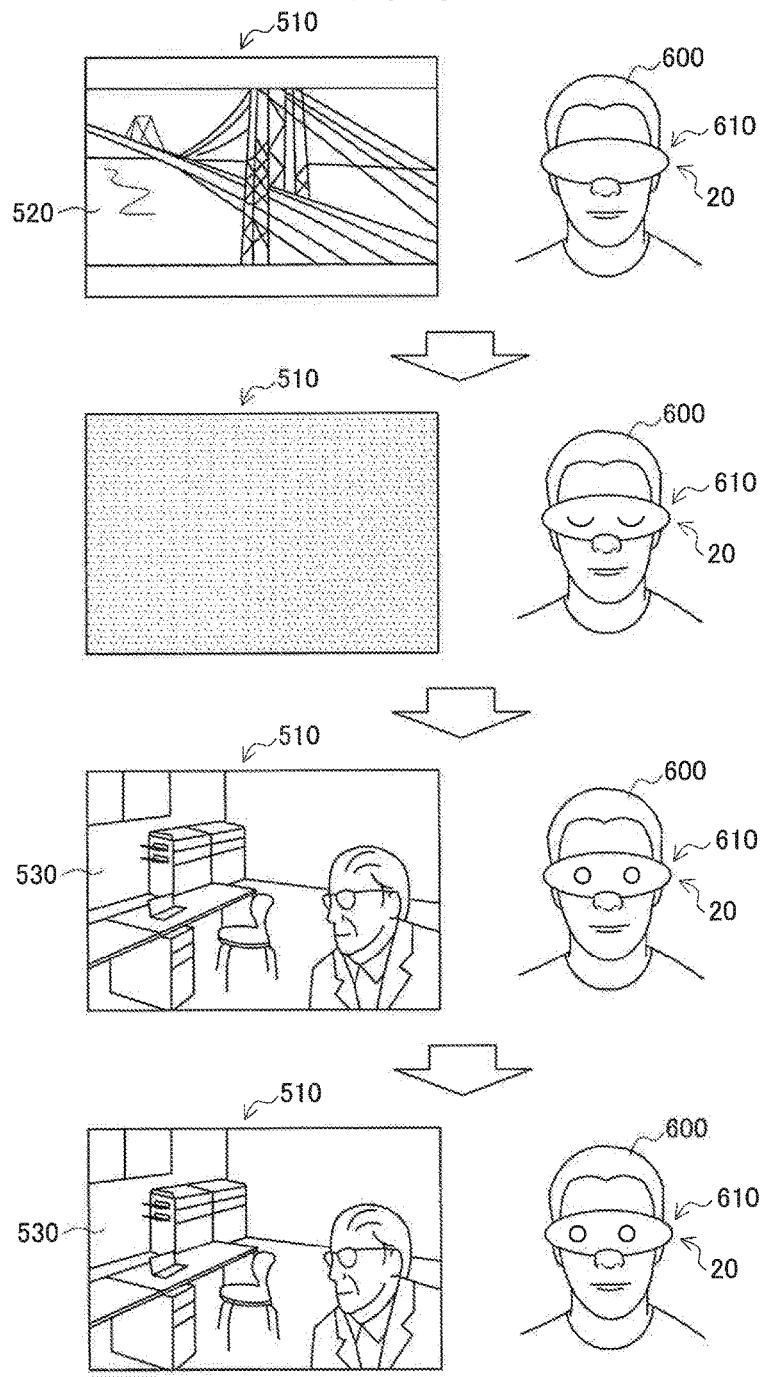

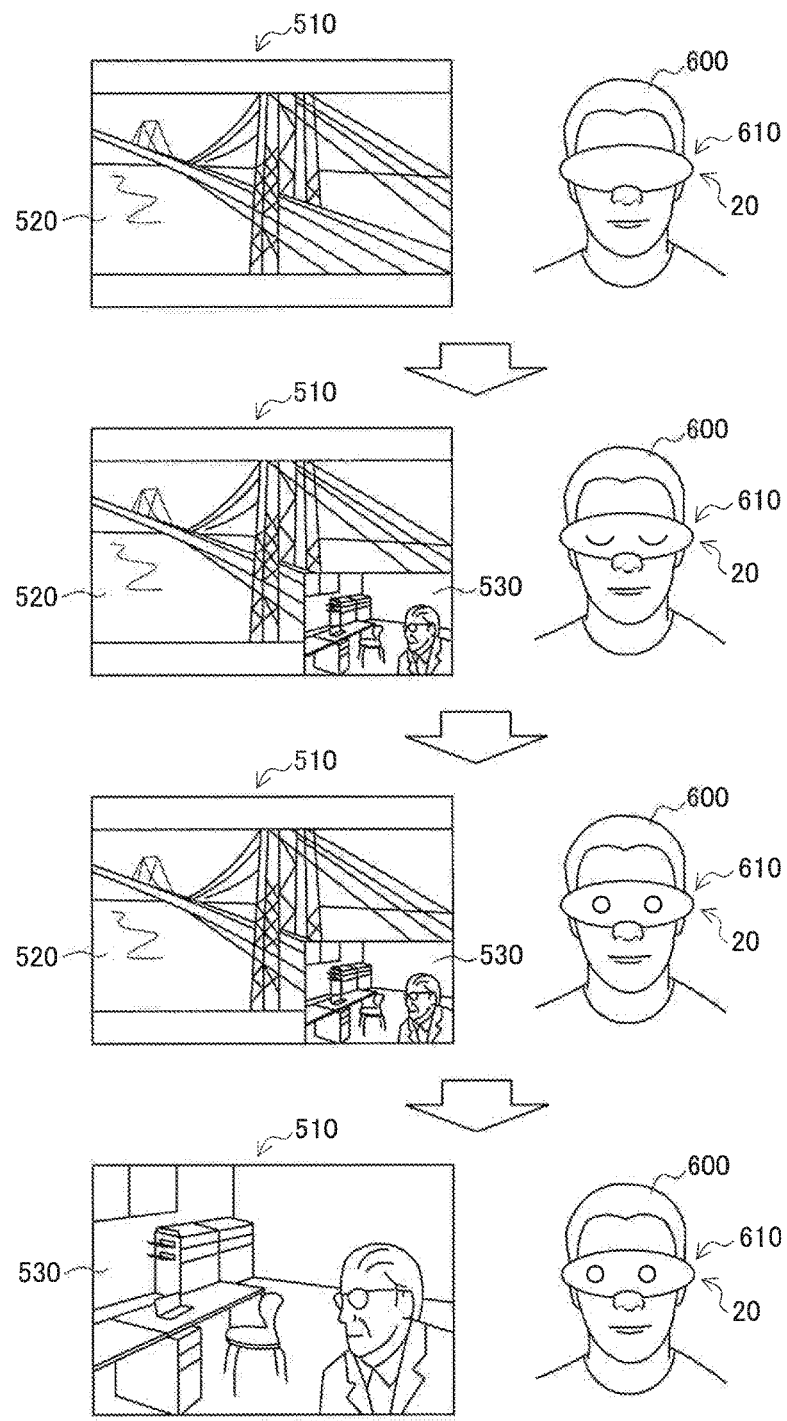

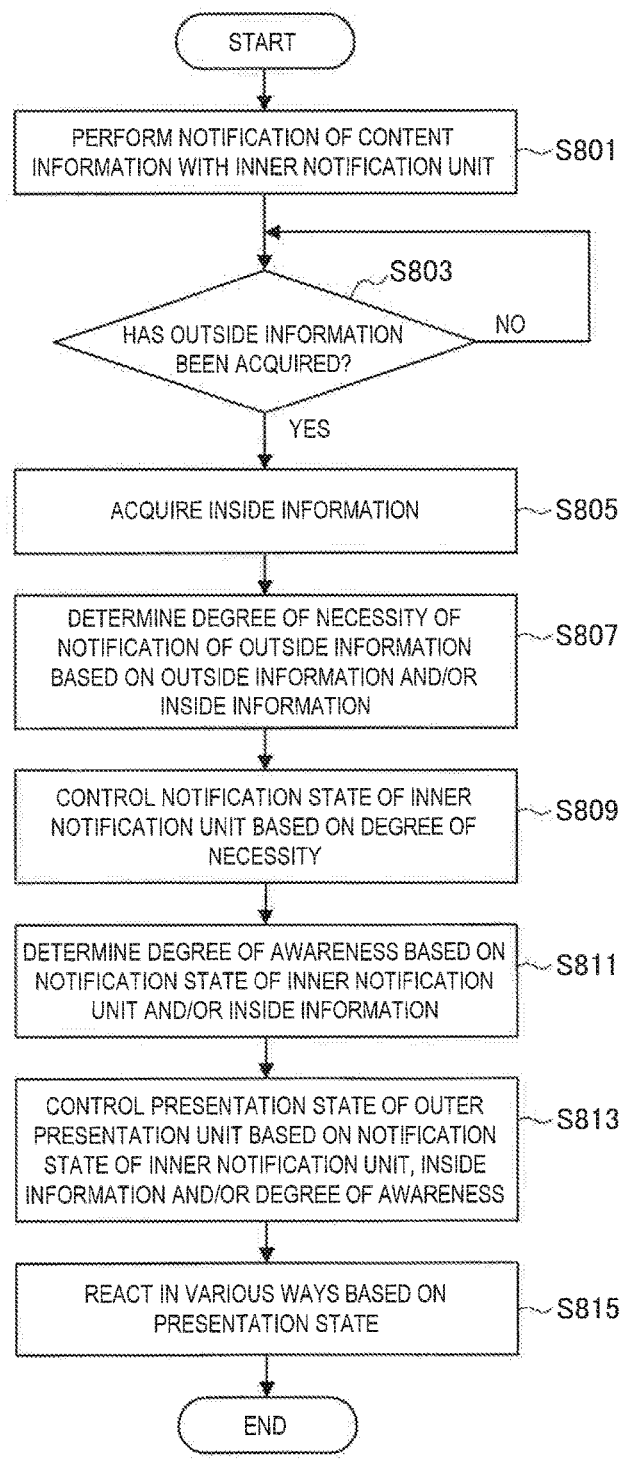

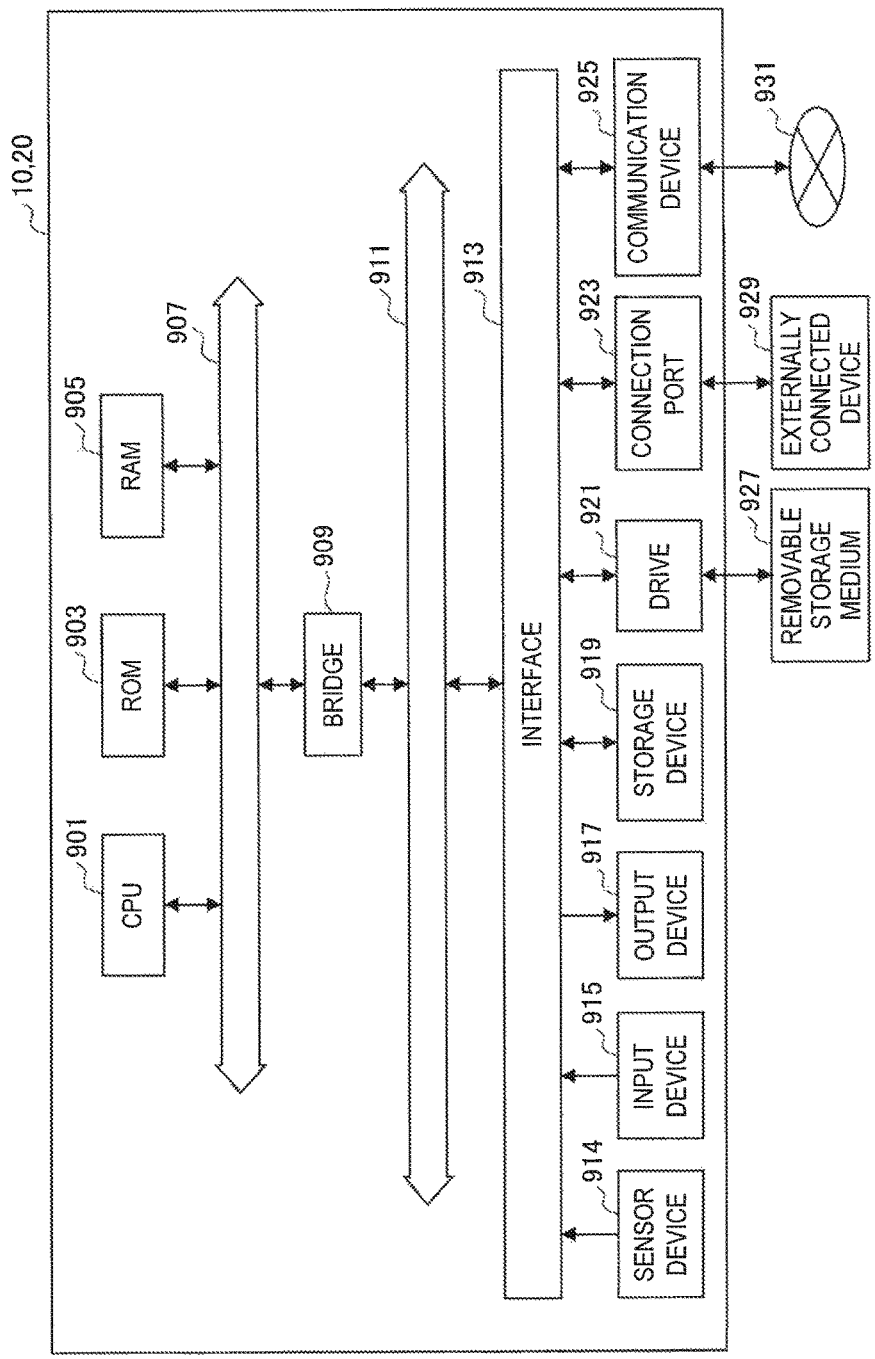

INFORMATION PROCESSING DEVICE, NOTIFICATION STATE CONTROL METHOD, AND PROGRAM

CROSS REFERENCE TO PRIOR APPLICATION

This application is a National Stage Patent Application of PCT International Patent Application No. PCT/JP2014/054046 (filed on Feb. 20, 2014) under 35 U.S.C. §371, which claims priority to Japanese Patent Application No. 2013-074830 (filed on Mar. 29, 2013), which are all hereby incorporated by reference in their entirety.

TECHNICAL FIELD

The present disclosure relates to an information processing device, a notification state control method, and a program.

BACKGROUND ART

As devices for realizing a virtual reality (VR) technology in which users are provided with virtual images as if they were real events and an augmented reality (AR) technology in which real images are displayed with various types of information superimposed thereon, head-mounted display (HMD) devices have been recently developed.

The display screen of an HMD device is placed in front of the eyes of a user when he or she is wearing the device, and there are see-through HMD devices through which outside states can be seen over the display screen, and non-see-through HMD devices whose display screen blocks the field of view of users. While outside states can be easily observed through a see-through HMD device, it is difficult to obtain a sense of immersion in display of the display screen with such devices since users are affected by light and the like of the outside environment. On the other hand, since outside visual information is blocked from users by non-see-through HMD devices, it is said that the non-see-through HMD devices are better when users want to concentrate on listening to and viewing content, working, and the like. For example, Patent Literature 1 discloses a technology relating to a non-see-through HMD device which can display more satisfactory images by preventing contaminants such as dirt or dust from entering a lens barrel in which a display screen is installed.

CITATION LIST

Patent Literature

Patent Literature 1: JP H9-90268A

SUMMARY OF INVENTION

Technical Problem

Although a user who is carrying out various kinds of work wearing a non-see-through HMD device can concentrate on the work, it is difficult for him or her to discern an external situation. In addition, when a user is wearing earphones, headphones or the like together with a non-see-through HMD device, it is even more difficult to discern an external situation. Thus, even when an outside person who attempts to communicate with a user wearing a non-see-through HMD device comes close to or starts speaking to the user, it is difficult for the user to be aware of the attempt. Thus, it is necessary for the outside person to make physical contact with the user wearing the non-see-through HMD device such as touching the body of the user when the outside person attempts to communicate. There is possibility of such abrupt physical contact causing discomfort or surprise in the user who is concentrating on his or her work while wearing the non-see-through HMD device and interfering with comfortable use.

Thus, smoother communication between a user wearing a non-see-through HMD device and an outside person has been demanded. Therefore, the present disclosure proposes an information processing device, a notification state control method, and a program which enable a user and an outside person to communicate smoothly.

Solution to Problem

According to the present disclosure, there is provided an information processing device including: a necessity degree determination unit configured to determine, based on outside information indicating a situation external to a user, a degree of necessity that the user be notified of the outside information; and a notification state control unit configured to switch a notification state of the outside information with respect to the user based on the determined degree of necessity.

According to the present disclosure, there is provided a notification state control method including: determining, based on outside information indicating a situation external to a user, a degree of necessity that the user be notified of the outside information; and switching a notification state of the outside information with respect to the user based on the determined degree of necessity.

According to the present disclosure, there is provided a program causing a computer to realize: a function of determining, based on outside information indicating a situation external to a user, a degree of necessity that the user be notified of the outside information; and a function of switching a notification state of the outside information with respect to the user based on the determined degree of necessity.

According to the present disclosure, the necessity degree determination unit determines, based on outside information indicating a situation external to a user, a degree of necessity that the user be notified of the outside information. In addition, the notification state control unit switches a notification state of the outside information with respect to the user based on the determined degree of necessity. Since the degree of necessity that the user be notified of the outside information is determined and notification of the outside information is performed based on the determined degree of necessity in this manner, the user can recognize that the outside information has been detected and can react appropriately to the outside information.

Advantageous Effects of Invention

According to the present disclosure described above, a user and an outside person can communicate more smoothly.

BRIEF DESCRIPTION OF DRAWINGS

FIG. 3 is an explanatory diagram for describing an example of a determination method for a degree of necessity for a notification of outside information by a necessity degree determination unit according to the embodiment.

FIG. 5 is an illustrative diagram for describing a specific example of notification state control by the notification state control unit when a degree of necessity is intermediate.

FIG. 9 is a functional block diagram illustrating an example of a configuration of the non-see-through HMD device according to the second embodiment of the present disclosure.

FIG. 13 is an illustrative diagram for describing a specific example of a connection between notification state control by a notification state control unit and presentation state control by the presentation state control unit.

FIG. 14 is an illustrative diagram for describing a specific example of a connection between notification state control by a notification state control unit and presentation state control by the presentation state control unit.

FIG. 15 is a flow chart showing the processing procedure of a presentation state control method according to the second embodiment of the present disclosure.

FIG. 16 is a functional block diagram showing a hardware configuration of the non-see-through HMD devices according to the first and second embodiments of the present disclosure.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Description will be provided in the following order.
1. First Embodiment
1-1. Exterior of non-see-through HMD device
1-2. Configuration of non-see-through HMD device
1-3. Specific example of notification state
   1-3-1. Case of high degree of necessity
   1-3-2. Case of intermediate degree of necessity
   1-3-3. Case of low degree of necessity
1-4. Processing procedure of notification state control method
2. Second Embodiment
2-1. Exterior of non-see-through HMD device
2-2. Configuration of non-see-through HMD device
2-3. Specific example of presentation state
2-4. Specific example of notification state and presentation state
2-5. Processing procedure of presentation state control method
3. Hardware configuration
4. Conclusion

1. First Embodiment

[1-1. Exterior of Non-See-Through HMD Device]

Figure 1A:
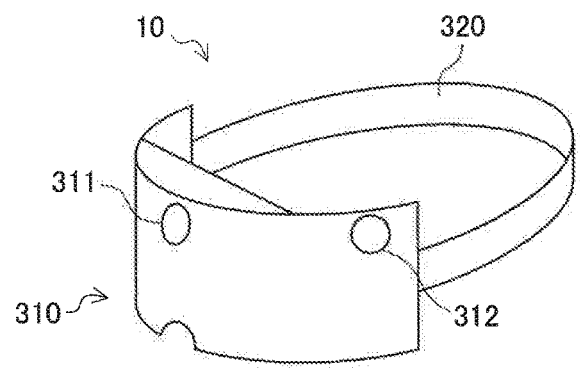
FIG. 1A is a perspective diagram illustrating an example of the exterior of a non-see-through HMD according to a first embodiment of the present disclosure.
Figure 1B:
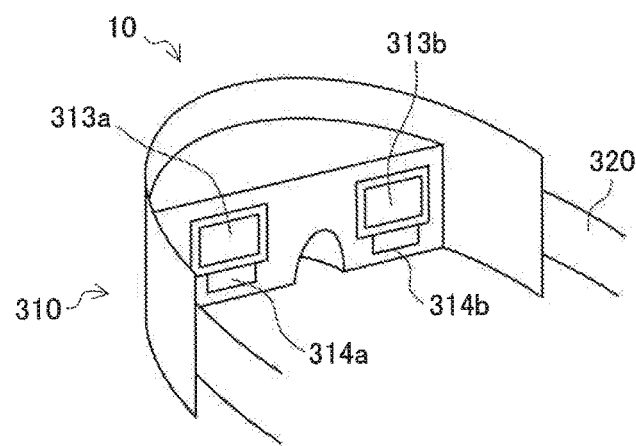
FIG. 1B is a perspective diagram illustrating an example of the exterior of a non-see-through HMD according to a first embodiment of the present disclosure.

First, an example of the exterior of a non-see-through HMD device according to a first embodiment of the present disclosure will be described with reference to FIGS. 1A and 1B. FIGS. 1A and 1B are perspective diagrams illustrating the example of the exterior of the non-see-through HMD device according to the first embodiment of the present disclosure. It should be noted that, when a user is assumed to be wearing the non-see-through HMD device, the side of the non-see-through HMD device that faces the user is referred to as the inside or inner side, and the side of the non-see-through HMD device that does not face the user is referred to as the outside or outer side in the following description.

FIG. 1A is a perspective diagram illustrating the non-see-through HMD 10 according to the first embodiment when viewed from the outer side. In addition, FIG. 1B is a perspective diagram illustrating the non-see-through HMD 10 according to the first embodiment when viewed from the inner side. Referring to FIGS. 1A and 1B, the non-see-through HMD 10 has a main body part 310 and a band part 320. The main body part 310 is shaped like goggles, is positioned in front of the eyes of the user when he or she is wearing the device, and blocks the outside from the user's field of view. The main body part 310 has various functions relating to driving of the non-see-through HMD device 10, such as a control unit which processes various types of information and comprehensively controls driving of the non-see-through HMD 10, a display unit which visually notifies the user of various types of information, and the like. The band part 320 is a strip-shaped member that is worn around the head of the user to fix the main body part 310 in front of the eyes of the user. The length, angle, and the like of the band part 320 may be adjustable so that a position of the main body part 310 is fixed in front of the eyes of the user.

Referring to FIG. 1A, a camera 311 and a microphone 312 are provided on the outer side of the main body part 310. The camera 311 captures states external to the user in the form of dynamic images or still images. In addition, the microphone 312 records sounds of states external to the user. Image information of images captured by the camera 311 and sound information of sounds recorded by the microphone 312 are transmitted to the control unit of the main body part 310. In the following description, information indicating situations external to the user such as the image information and sound information mentioned above is referred to as outside information. As described above, the camera 311 and the microphone 312 have the function of detecting outside information. It should be noted that the camera 311 and the microphone 312 may detect outside information at all times, or when the outside information has been changed, may detect the changed outside information. When a change occurs in outside information, for example, it may be a change in a person or an object included within a frame of the camera 311 in the case of image information, or a change in a sound recorded by the microphone 312 in the case of sound information.

Referring to FIG. 1B, inner display units 313a and 313b and line-of-sight sensor units 314a and 314b are provided on the inner side of the main body part 310. The inner display units 313a and 313b are provided at positions in front of the eyes of the user when the user is wearing the non-see-through HMD device 10, and display various types of information on display screens in various forms such as images, text, graphs, and tables to visually notify the user of the information. In the example illustrated in FIG. 1B, the inner display units 313a and 313b are provided at positions corresponding to the left and right eyes of the user, and can provide three-dimensional images (3D images) to the user. The user can enjoy content of, for example, movies and the like or can do various kinds of work using a word processing software, spreadsheet software, and the like while referring to the display screens of the inner display units 313a and 313b. In addition, the display screens of the inner display units 313a and 313b are designed not to be observed by transmitting outside states, and the outside space is blocked from the field of view of the user wearing the non-see-through HMD device 10 by the inner display units 313a and 313b. Thus, the user can concentrate on information displayed on the display screens of the inner display units 313a and 313b, and can be immersed in his or her work. It should be noted that, although the case in which the non-see-through HMD device 10 has one pair of inner display units 313a and 313b has been described, the present embodiment is not limited thereto. The non-see-through HMD device 10 may have an inner display unit with one display screen.

The line-of-sight sensor units 314a and 314b are sensor devices which detect states of the eyes of the user. A state of the eyes may herein be any state relating to the eyes of the user such as open and closed states of the eyelids, states of the pupils, and states of the line of sight. In the example illustrated in FIG. 1B, the line-of-sight sensor units 314a and 314b are provided at positions corresponding to the left and right eyes of the user, and each can detect a state of one of the left and right eyes of the user. Information regarding a state of the eyes of the user detected by the line-of-sight sensor units 314a and 314b (hereinafter referred to as line-of-sight information) is transmitted to the control unit of the main body part 310. In the following description, information relating to a user is referred to as inside information. In the present embodiment, inside information includes information indicating states of the user (hereinafter referred to as user information) and/or information other than outside information of which the user is notified (hereinafter referred to as content information). The line-of-sight information is included in user information, and thus the line-of-sight sensor units 314a and 314b have the function of detecting inside information. It should be noted that details of inside information will be described below with reference to FIG. 2. In addition, the line-of-sight sensor units 314a and 314b may detect inside information at all times, and when a change occurs in inside information, may detect the changed inside information.

In addition, although not illustrated in FIGS. 1A and 1B, the non-see-through HMD device 10 may have an audio output unit such as an earphone device or a speaker device by which the user is audibly notified of various types of information. In addition, the non-see-through HMD device 10 may have various sensor devices for detecting user information such as an acceleration sensor device, a Global Positioning System (GPS) sensor device, and a bio-sensor device, and with these sensors, motion information indicating a motion of a user, position information of the user, biological information of the user, and the like may be detected as inside information.

The example of the exterior of the non-see-through HMD device 10 according to the first embodiment of the present disclosure has been described above with reference to FIGS. 1A and 1B. As described above, the non-see-through HMD device 10 has the configuration for detecting outside information, as typified by the camera 311 and the microphone 312. In addition, the non-see-through HMD device 10 has the configuration for detecting inside information, as typified by the line-of-sight sensor units 314a and 314b. Further, the non-see-through HMD device 10 has the configuration for notifying the user of various types of information, such as the inner display units 313a and 313b and the audio output unit. In addition, in the first embodiment, the control unit provided in the main body part 310 determines a degree of necessity that the user be notified of outside information based on detected outside information to switch a notification state of the outside information with respect to the user based on the degree of necessity. For example, the control unit can notify the user of the outside information by displaying the information in the inner display units 313a and 313b, or can notify the user of the outside information by displaying the information in the inner display units 313a and 313b in stages according to the degree of necessity. Here, notifying a user of information may include notifying the user of the information visually by displaying the information on the display screens of the inner display units 313a and 313b as an image or auditorily by outputting the information from the audio output unit as a sound. As described above, the non-see-through HMD device 10 can also be said to be a notification state control device which controls a notification state of various types of information with respect to a user. In the following description, a series of processes of notification state control performed by the non-see-through HMD device 10 is referred to as a notification state control process. In addition, since various information processes of the notification state control process are performed by the non-see-through HMD device 10, the non-see-through HMD device 10 is also referred to as an information processing device 10 in the following description.

[1-2. Configuration of Non-See-Through HMD Device]

Figure 2:
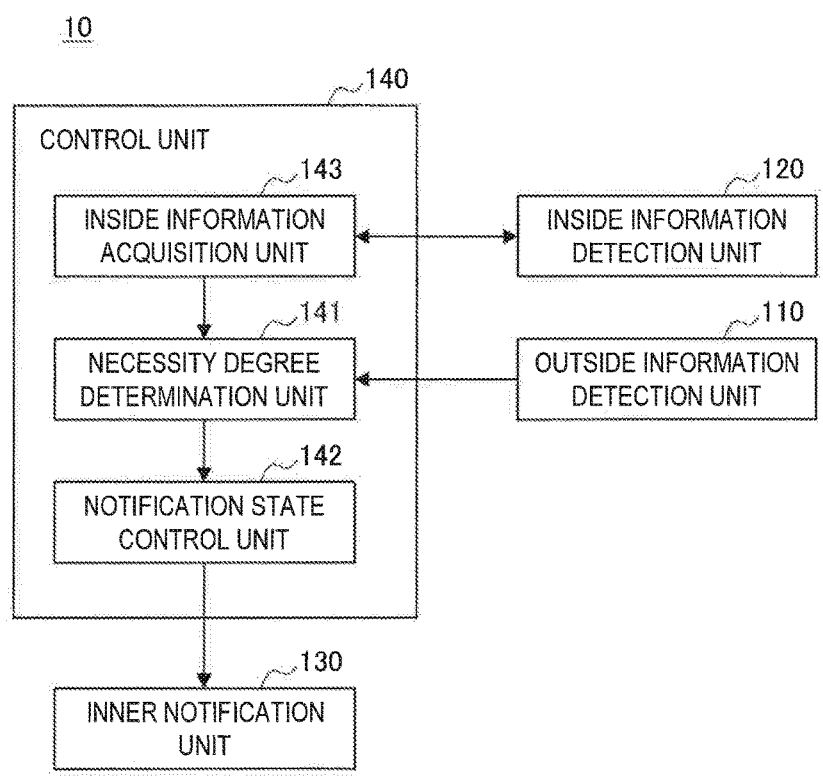
FIG. 2 is a functional block diagram showing an example of a configuration of the non-see-through HMD device according to the first embodiment of the present disclosure.

Next, a configuration of the non-see-through HMD device 10 according to the first embodiment of the present disclosure will be described with reference to FIG. 2. FIG. 2 is a functional block diagram showing an example of the configuration of the non-see-through HMD device 10 according to the first embodiment of the present disclosure. Referring to FIG. 2, the non-see-through HMD device 10 according to the first embodiment includes an outside information detection unit 110, an inside information detection unit 120, an inner notification unit 130, and the control unit 140.

The outside information detection unit 110 detects outside information indicating a situation external to the user. The outside information detection unit 110 corresponds to, for example, the camera 311 and the microphone 312 illustrated in FIG. 1A.

Herein, outside information will be described in detail. The outside information is information indicating a situation external to the user as described above, and the outside information includes various types of information of the outside of the user. For example, the outside information may be image information, sound information, and the like indicating a situation external to the user. It should be noted that the outside information can include not only image information relating to an image using visible light but also image information relating to an image using light having other wavelength bands, for example, infrared light and the like. In addition, the outside information may include various types of information indicating an environment external to the user such as distance information with respect to an object near the user, temperature information of an object near the user, and the like. More specifically, the outside information includes, for example, information indicating that an outside person is approaching the user, information indicating that an outside person has started talking (started speaking) to the user, and/or information regarding a motion (gesture) of an outside person, which are included in the image information. In addition, the outside information includes, for example, information regarding content spoken by an outside person, and/or information regarding a warning sound of a siren or a buzzer included in the sound information. Moreover, when the non-see-through HMD device 10 has a communication unit that exchanges information with another outside device, the outside information may include information regarding the other device detected through the communication unit (hereinafter referred to as device information). The device information includes, for example, ID information for specifying a person who possesses the other device. As described above, the outside information may include various types of information indicating a situation external to the user such as image information indicating a situation external to the user, sound information indicating a situation external to the user and/or device information acquired through communication with another device external to the user.

The outside information detection unit 110 is configured as a device which detects various kinds of outside information as described above. For example, the outside information detection unit 110 has an image-capturing device such as a camera for acquiring image information, a sound recording device such as a microphone for acquiring sound information, and/or a communication device for acquiring device information. In addition, the outside information detection unit 110 may have various kinds of sensor devices which detect an outside environment, such as an infrared sensor device, a distance sensor device, a temperature sensor device, and the like. The outside information detection unit 110 transmits detected outside information to the control unit 140.

The inside information detection unit 120 detects inside information that is information relating to the user. The inside information detection unit 120 corresponds to, for example, the line-of-sight sensor units 314a and 314b illustrated in FIG. 1B.

Inside information will be described herein in detail. The inside information is information relating to the user as described above, and various types of information relating to the user wearing the non-see-through HMD device 10 is included in the inside information. In the present embodiment, the inside information includes information indicating a state of the user (user information) and/or information other than outside information of which the user is notified (content information).

The user information includes at least any of motion information indicating a motion of the user, position information of the user, biological information of the user, and information regarding an action schedule of the user. The motion information is information, for example, detected by a sensor device which detects a motion or a posture of an object, such as an acceleration sensor device or a gyro sensor device, indicating a motion (for example, standing, sitting, walking, or the like) or a posture (for example, inclination of the head) of the user. The position information is information, for example, detected by a sensor device which detects a position of an object, such as a GPS sensor device, indicating a position of the user (for example, at work, at home, on a train, or the like). The biological information is various types of information regarding biological activities of the user, indicating a pulse, a heartbeat, a breathing rate, a state of the eyes, and the like of the user. The line-of-sight information described above in [1-1. Exterior of non-see-through HMD device] is included in the biological information. Information regarding an action schedule of the user is information, for example, acquired from schedule information of the user recorded on a recording medium that the non-see-through HMD device 10 can access, including information indicating, for example, whether a specific time is a work time or a rest time for the user or the like.

The content information is information other than the outside information of which the user is notified as described above. As such, in the present embodiment, information of which the user is notified may be outside information and/or content information, and control of a notification state may be control of switching such information of which the user is notified. For example, the content information includes dynamic motion information of a movie, a television program, or the like, information relating to work performed using a word processing software, spreadsheet software, or the like, or information on a web site that is viewed using browser software. As described above, the content information may be information of which the user is notified when the user performs various processes while wearing the non-see-through HMD device 10 (non-see-through HMD device 10). In the following description, a state in which a user has been notified of content information and is performing various processes based on the content information is also referred to as a state in which the user is working.

The inside information detection unit 120 is configured as a device which detects various types of inside information as described above. For example, the inside information detection unit 120 has an acceleration sensor device, a gyro sensor device, a GPS sensor device, a bio-sensor device, and the like for acquiring various types of user information. In addition, the inside information detection unit 120 has a configuration, for example, for detecting various types of content information, i.e., a configuration for detecting information other than outside information out of information of which the user has been notified. The inside information detection unit 120 transmits the detected outside information to the control unit 140.

Driving of the inner notification unit 130 is controlled by the control unit 140, and the inner notification unit 130 notifies the user of various types of information in various forms. Here, notification of information with respect to the user includes visual notification and auditory notification. For example, the inner notification unit 130 has a display screen for displaying various types of information on the display screen in various forms of images, text, graphs, tables, and the like, and thereby visually notifying the user of the information. In addition, the inner notification unit 130 has, for example, an audio output device such as a speaker or earphones for outputting various types of information as sounds from the audio output device, and thereby auditorily notifying the user of the information. As described above, the inner notification unit 130 can serve as a display unit which displays various types of information on the display screen and as the audio output unit which outputs various types of information as sounds.

The configuration of the inner notification unit 130 as the display unit is, for example, the configuration of the inner display units 313a and 313b illustrated in FIG. 1B. The inner notification unit 130 notifies the user of content information by displaying a content image that is image information included in the content information on the display screen. In addition, driving of the inner notification unit 130 is controlled by the control unit 140, and the inner notification unit 130 notifies the user of outside information by displaying an outside image that is image information included in the outside information on the display screen. It should be noted that the inner notification unit 130 may display only one of a content image and an outside image on the display screen, or may display both the content image and the outside image on the display screen.

In addition, when the inner notification unit 130 has the configuration as the audio output unit, the inner notification unit 130 notifies the user of content information by outputting a content sound that is sound information included in the content information. In addition, driving of the inner notification unit 130 is controlled by the control unit 140, and the inner notification unit 130 notifies the user of outside information by outputting an outside sound that is sound information included in the outside information. It should be noted that the inner notification unit 130 may output only one of a content sound and an outside sound, or may output both the content sound and the outside sound.

The control unit 140 comprehensively controls the non-see-through HMD device 10, and performs various information processes of the notification state control process according to the present embodiment. The function and configuration of the control unit 140 will be described below in detail.

The control unit 140 has a necessity degree determination unit 141, a notification state control unit 142, and an inside information acquisition unit 143.

The necessity degree determination unit 141 determines a degree of necessity that the user be notified of outside information based on the outside information indicating a situation external to the user. Specifically, the necessity degree determination unit 141 acquires the outside information detected by the outside information detection unit 110, and determines a degree of necessity (degree of necessity of a notification) that the user be notified of the outside information based on the outside information. In this way, the necessity degree determination unit 141 analyzes the content of the acquired outside information, and thereby can determine the degree of necessity based on the content. For example, a table in which types of outside information and degrees of necessity are associated may be prepared, and the necessity degree determination unit 141 may determine a degree of necessity by referring to the table. In addition, a pre-decided score may be assigned to each type of outside information, and the necessity degree determination unit 141 may determine a degree of necessity by computing the score for detected outside information.

Herein, an example of a determination method for a degree of necessity of a notification of outside information performed by the necessity degree determination unit 141 will be described with reference to FIG. 3. FIG. 3 is an explanatory diagram for describing the example of the determination method for a degree of necessity of a notification of outside information performed by the necessity degree determination unit 141 according to the present embodiment. It should be noted that the example shown in FIG. 3 corresponds to a method using the table mentioned above.

Referring to FIG. 3, types of outside information are listed in the topmost row and the leftmost column of the table, and degrees of necessity are decided according to combinations of outside information. In the topmost row, "person approaching," "person speaking", "specific gesture," and "inter-device communication" are described as examples of outside information. "Person approaching" and "specific gesture" are information acquired from image information included in the outside information, meaning that an outside person is approaching and making a specific gesture to the user wearing the non-see-through HMD device 10. A specific gesture is a sign indicating an intention to communicate with the user, for example, outstretching an arm, waving a hand, or the like toward the user. "Person speaking" is information acquired from sound information included in the outside information, meaning that an outside person has started talking to the user who is wearing the non-see-through HMD device 10. "Inter-device communication" is information acquired from device information included in the outside information, meaning that an outside person having an apparatus (device) that can communicate with the non-see-through HMD device 10 is approaching the user, or is within a predetermined range in which communication is possible.

In the leftmost column, "acquaintance" and "stranger" are described as examples of the outside information. "Acquaintance" and "stranger" indicate whether the user is acquainted with a person approaching the user, a person making a gesture toward the user, and a person talking to the user based on the outside information listed in the topmost row. When the outside information includes device information, for example, it may be determined whether the user is acquainted with the person based on ID information which indicates the owner of the other device which is included in the device information. In addition, when the outside information includes image information and the image information includes an image of the face of an outside person, for example, it may be determined whether the user is acquainted with the person by recognizing the person based on the image of the face.

In the example shown in FIG. 3, degrees of necessity are determined by three grades of "high," "intermediate," and "low." Referring to FIG. 3, when "person speaking" or "specific gesture" is acquired as outside information, for example, the necessity degree determination unit 141 determines a degree of necessity of the outside information to be "high," regardless of whether or not the user is acquainted with an outside person performing such an action. This is because, when the outside person has spoken to the user or made a specific gesture, the outside person who has performed the action is considered to have a clear intention to communicate with the user.

In addition, for example, when "person approaching" or "inter-device communication" is acquired as outside information, the necessity degree determination unit 141 determines the degree of necessity of the outside information to be "intermediate" if the user is acquainted with the outside person performing the action, and determines the degree of necessity of the outside information to be "low" if the user is not acquainted with the outside person performing the action. One reason for this is that, even when an outside person has approached the user and "person approaching" or "inter-device communication" is acquired as outside information, there is considered to be a possibility that the outside person performing the action is passing by the user by chance or for some other purpose. In addition, another reason is that there is a high possibility of the outside person having approached the user for the purpose of communication if the outside person is one with whom the user is acquainted, and a high possibility of the outside person moving away without communicating with the user if the outside person is one with whom the user is not acquainted.

In addition, although not shown in FIG. 3, when special information is included in the outside information, the necessity degree determination unit 141 can determine a degree of necessity that the user be notified of the outside information to be "high." The special information refers to outside information indicating a state of emergency, for example, a siren, a warning, a shouting of a person, and the like. Since it is necessary that the user be reliably notified of such outside information indicating a state of emergency, the necessity degree determination unit 141 determines the degree of necessity to be "high." It should be noted that specific information to be used as the special information may be appropriately set by the user. Consequently, the user can arbitrarily set a degree of necessity of a notification for special outside information.

The example of the determination method for a degree of necessity of a notification of outside information performed by the necessity degree determination unit 141 has been described above with reference to FIG. 3. When a plurality of pieces of outside information are detected, the necessity degree determination unit 141 can determine a degree of necessity that the user be notified of the outside information according to a combination of the outside information as described above. In addition, the necessity degree determination unit 141 can determine a degree of necessity based on various types of information obtained from the outside information, such as specifying the owner of the device based on device information or specifying an outside person based on an image of the face included in image information. It should be noted that the process of obtaining various types of information from such outside information may be performed by the necessity degree determination unit 141 or by the outside information detection unit 110, and the obtained information may then be transmitted to the necessity degree determination unit 141 as part of the outside information.

It should be noted that a determination method for a degree of necessity performed by the necessity degree determination unit 141 is not limited to the example shown in FIG. 3. Although a degree of necessity is determined as one of three grades in the example shown in FIG. 3, the number of grades for classifying the degree of necessity is not limited to 3, and may be a smaller or larger number. In addition, the necessity degree determination unit 141 may compute a degree of necessity in such a way that, for example, a score indicating a degree of necessity is assigned to each piece of outside information shown in FIG. 3 ("person approaching," "person speaking," "specific gesture," "inter-device communication," "acquaintance," and "stranger") and scores assigned to the plurality of pieces of detected outside information are added together.

In addition, when a person who attempts to communicate with the user is specified as an individual based on an image of the face of the outside person of image information included in outside information, ID information of the outside person of device information included in the outside information, or the like, for example, the necessity degree determination unit 141 may determine a degree of necessity according to the person. For example, when a person who attempts to communicate with the user is a person with a business relation with the user such as a co-worker or a boss in the user's company or a person from another company whom the user has met on business, there is considered to be a high possibility of the communication that the person attempts to have also relating to business, and thus the necessity degree determination unit 141 may determine a degree of necessity thereof to be high. In addition, when a person who attempts to communicate with the user is a person with a private relation with the user such as a friend or a family member of the user, there is considered to be a high possibility of the communication that the person attempts to have also relating to private matters, and thus the necessity degree determination unit 141 may determine a degree of necessity thereof to be intermediate or low. It should be noted that a relation with a person who attempts to communicate with the user can be determined based on information indicating the social relation of the user stored in, for example, a storage unit of the non-see-through HMD device 10 (not illustrated) or another device owned by the user that can communicate with the non-see-through HMD device 10 (for example, a mobile telephone, a personal computer (PC), or the like). The information indicating the social relation of the user may be information of a telephone book or an address book of the user stored in the non-see-through HMD device 10 and another device that the user owns, or information of registration of friends on a social networking service (SNS) to which the user belongs.

Returning to FIG. 2, description of the configuration of the non-see-through HMD device 10 will continue. The necessity degree determination unit 141 transmits a determined necessity degree and outside information detected by the outside information detection unit 110 to the notification state control unit 142.

The notification state control unit 142 switches a notification state of the outside information with respect to the user based on the degree of necessity determined by the necessity degree determination unit 141. Here, notifying the user of information may include notifying the user of the information visually by displaying the information on the display screen of the inner notification unit 130 as an image or auditorily by outputting the information from the audio output unit of the inner notification unit 130 as a sound. In addition, controlling a notification state may include controlling driving of the inner notification unit 130 and controlling a notification state of information of which the user is notified to be switched. For example, it is assumed that, during work, a content image is displayed on the display screen of the inner notification unit 130, a content sound is output from the audio output unit of the inner notification unit 130, and various kinds of work are performed while the user is referring to the content information of which he or she is notified. In this state, when the outside information detection unit 110 detects outside information, the notification state control unit 142 switches the notification state of the information with respect to the user based on a notification necessity degree of the outside information for the user determined by the necessity degree determination unit 141. Specifically, in the present embodiment, the notification state control unit 142 switches the notification state of the outside information for the user by controlling the display of the display screen of the inner notification unit 130 and/or controlling the output of the audio output unit of the inner notification unit 130 based on the degree of necessity.

Here, it is necessary for the notification state control unit 142 to determine the grade or height of the degree of necessity in order to switch the notification state. For example, the notification state control unit 142 may switch the notification state of the outside information with respect to the user by determining the grade or height of the degree of necessity based on the result obtained by comparing the degree of necessity determined by the necessity degree determination unit 141 to a predetermined threshold value. For example, when the degree of necessity is equal to or higher than a first threshold value, the notification state control unit 142 can determine the degree of necessity to be high. In addition, when the degree of necessity is lower than the first threshold value and equal to higher than a second threshold value that is lower than the first threshold value, for example, the notification state control unit 142 can determine the degree of necessity to be intermediate. Further, when the degree of necessity is lower than the second threshold value, for example, the notification state control unit 142 can determine the degree of necessity to be low. However, a condition for determining the height of a degree of necessity is not limited to the above example, and can be appropriately changed by the user. For example, changing expressions of "equal to or higher than" and "lower than" for defining the number of threshold values (i.e., the number of grades of a degree of necessity) and specific values and ranges of the first threshold value and the second threshold value to expressions of "exceeding" and "equal to or lower than" and the like may be appropriately adjusted by the user.

It should be noted that, when a degree of necessity is expressed by several grades as shown in FIG. 3, for example, the notification state control unit 142 may determine to what grade the degree of necessity belongs based on information regarding the degree of necessity transmitted from the necessity degree determination unit 141 without comparing to the threshold values.

It should be noted that, although the expressions "high," "intermediate," and "low" are used in order to show the grade or height of a degree of necessity determined by the necessity degree determination unit 141 in the following description for the sake of convenience, these expressions may be based on a comparison result to the predetermined threshold values described above (for example, the first threshold value and the second threshold value), or may indicate the grades of the degree of necessity as in the example shown in FIG. 3.

For example, when the degree of necessity determined by the necessity degree determination unit 141 is "high" (for example, when it is equal to or higher than the first threshold value), the notification state control unit 142 causes the user to be notified of the outside information. Specifically, when the degree of necessity determined by the necessity degree determination unit 141 is "high," the notification state control unit 142 causes the user to be directly notified of the outside information. It should be noted that direct notification of the outside information to the user means notifying the user of the outside information with no intermediate step, i.e., without display of another screen, output of a sound, or the like. As a specific example in which the user is directly notified of the outside information, for example, the notification state control unit 142 may switch display of the display screen and output of a sound of the inner notification unit 130 from a content image and a content sound to an outside image and an outside sound. In addition, for example, the notification state control unit 142 may notify the inner notification unit 130 of both content information and outside information. That is to say, both a content image and an outside image may be displayed on the display screen of the inner notification unit 130, and both a content sound and an outside sound may be output from the audio output unit of the inner notification unit 130. Further, when both a content image and an outside image are displayed on the display screen of the inner notification unit 130, the display screen may be divided into two parts to display respective images thereon, or the outside image may be displayed by being superimposed on the content image.

In addition, when the degree of necessity determined by the necessity degree determination unit 141 is "intermediate" (for example, when it is lower than the first threshold value and equal to or higher than the second threshold value that is lower than the first threshold value), the notification state control unit 142 causes the user to be notified of the outside information in stages. As a specific example in which the user is notified of the outside information in stages, for example, if the outside information is image information and sound information indicating a situation external to the user, the notification state control unit 142 may cause the sound information to be notified of by superimposing it on content information, and then cause the image information to be notified of by superimposing it. That is to say, while the notification state control unit 142 displays and outputs a content image and a content sound to the user who is working while viewing and listening to the content image and the content sound, the notification state control unit may first cause only the outside sound of the outside information to be superimposed and output, and then cause the outside image to be superimposed and displayed.

In addition, when the degree of necessity determined by the necessity degree determination unit 141 is "low" (for example, when it is lower than the second threshold value), for example, the notification state control unit 142 causes the user to be notified of predetermined information indicating that the outside information has been detected. That is to say, the notification state control unit 142 may cause the user who is working while viewing and listening to the content image and the content sound to be notified of only the fact that the outside information has been detected, rather than notifying the user of the outside information as is through notification of the content image and the content sound.

In addition, when the degree of necessity determined by the necessity degree determination unit 141 is "low" (for example, when it is lower than the second threshold value), for example, the notification state control unit 142 does not change the display of the display screen and output of a sound of the inner notification unit 130. That is to say, the user may not be informed of the outside information. In this way, controlling a notification state of the outside information by the notification state control unit 142 can also include the state in which the user is not notified of the outside information. A specific example of controlling a notification state by the notification state control unit 142 will be described below in [1-3. Specific example of notification state] in detail.

The inside information acquisition unit 143 acquires inside information that is information relating to the user. Specifically, the inside information acquisition unit 143 acquires inside information detected by the inside information detection unit 120. The inside information acquisition unit 143 may acquire the inside information from the inside information detection unit 120 often, or may acquire the inside information at a predetermined timing by issuing a command to detect the inside information to the inside information detection unit 120 when necessary. The inside information acquisition unit 143 transmits the acquired inside information to the necessity degree determination unit 141.

The necessity degree determination unit 141 determines a notification necessity degree of the outside information based on the outside information as described above, and the necessity degree determination unit 141 can determine the degree of necessity based further on inside information. Specifically, the necessity degree determination unit 141 determines a degree of necessity that the user be notified of the outside information (notification necessity degree) based on outside information detected by the outside information detection unit 110 and inside information acquired by the inside information acquisition unit 143. In this manner, the necessity degree determination unit 141 can analyze the content of the acquired outside information and inside information, and thereby determines a degree of necessity based on the content.

For example, when inside information includes position information of the user, the necessity degree determination unit 141 may determine a degree of necessity based on the position information. For example, when the user is at work, various people attempt to communicate with the user, regardless of whether the user is acquainted with them, but when the user is at home, there is a low possibility of a stranger attempting to communicate with the user. Thus, when the user is determined to be at home based on position information included in inside information, the necessity degree determination unit 141 can determine a degree of necessity on the assumption that a person attempting to communicate is an acquaintance. In addition, when the user at work, for example, there is a high possibility of the content of the communication attempted by an outside person relating to work, and thus the necessity degree determination unit 141 may determine the degree of necessity to be relatively higher than when the user is at home, even though the degree of necessity is determined based on the same outside information. In this way, the necessity degree determination unit 141 can determine where the user is, for example, at home, at work, in a car, on a train, and the like based on position information included in inside information, and then determine the degree of necessity according to where the user is.

In addition, when inside information includes motion information indicating a motion of the user, for example, the necessity degree determination unit 141 may determine a degree of necessity based on the motion information. For example, when the user is standing up from his or her sitting state or when the user is starting to walk, there is a high possibility of the user attempting to stop his or her work to perform another action, and thus it is considered necessary that the user be notified of outside information. In this way, when the user is determined to be stopping work based on motion information that is included in inside information, the necessity degree determination unit 141 can determine a high necessity degree.

In addition, when inside information includes information regarding an action schedule of the user, for example, the necessity degree determination unit 141 may determine a degree of necessity based on the information regarding the action schedule of the user. For example, based on the information regarding the action schedule of the user, the necessity degree determination unit 141 can determine the degree of necessity that the user be notified of the outside information to be relatively low when the user is determined to be working, and can determine the degree of necessity that the user be notified of the outside information to be relatively high when the user is determined to be resting.

In addition, when inside information includes content information, for example, the necessity degree determination unit 141 may determine a degree of necessity based on the content information. For example, when the necessity degree determination unit 141 determines a degree of importance of work that the user is performing based on content information that the user is notified of and the degree of importance of the work is high, the necessity degree determination unit can determine a degree of necessity that the user be notified of the outside information to be relatively low to avoid interrupting the work of the user as much as possible, and when the degree of importance of the work is low, the necessity degree determination unit can determine the degree of necessity that the user be notified of the outside information to be relatively high. It should be noted that a relation between content information and a degree of importance of work may be arbitrarily set by the user. For example, when the content information is dynamic image information such as a movie, the content information may include information regarding each scene, and the necessity degree determination unit 141 may determine a degree of necessity that the user be notified of the outside information by determining a degree of intensity in the scene of the dynamic image information of which the user is being notified based on the information regarding each scene. The information regarding each scene may be, for example, information indicating that the scene mainly displays scenery, information indicating that the scene mainly includes conversations of characters, or information indicating "a degree of intensity" of each scene. For example, a degree of intensity is set to be relatively low for a scene of a dynamic image mainly displaying scenery since the scene is considered to be unimportant to the plot, and to be relatively high for a scene of a dynamic image mainly including conversations between characters since the scene is considered to be important to the plot. Thus, the necessity degree determination unit 141 determines a scene of a dynamic image that the user is viewing and listening to from content information, and can determine a degree of necessity that the user be notified of the outside information to be relatively high when a degree of intensity is low, or can determine a degree of necessity that the user be notified of the outside information to be relatively low when a degree of intensity is low.

In addition, the necessity degree determination unit 141 may determine a degree of immersion of the user with respect to content information of which the user is notified based on inside information, and determine a degree of necessity based further on the degree of immersion. Determination of a degree of immersion may be performed based on, for example, motion information, biological information, content information, and the like included in inside information. For example, a degree of immersion may be determined based on information regarding a posture (for example, inclination of the neck) or a motion of the head of the user acquired from motion information. In addition, a degree of immersion may be determined based on, for example, information of a pulse, a heartbeat, line-of-sight information, and the like of the user acquired from biological information. In addition, a degree of immersion may be determined based on, for example, information regarding each scene or information regarding "a degree of intensity" acquired from content information as described above.

The example of the configuration of the non-see-through HMD device 10 according to the first embodiment of the present disclosure has been described above in detail with reference to FIG. 2. Each constituent element described above may be configured using a versatile member or circuit, and may be configured as hardware specified in the function of the constituent element. In addition, for the control unit 140, a central processing unit (CPU) may perform all functions of respective constituent elements. Thus, a configuration to be used can be appropriately changed according to the technical level of each time the present embodiment is implemented. It should be noted that a hardware configuration of the non-see-through HMD device 10 will be described in <3. Hardware configuration> below in detail.

In the first embodiment above, the necessity degree determination unit 141 determines a degree of necessity that a user be notified of outside information based on the outside information indicating a situation external to the user as described with reference to FIG. 2. In addition, the notification state control unit 142 switches a notification state of the outside information with respect to the user based on the determined degree of necessity. Since a degree of necessity that the user be notified of outside information is determined and the notification of the outside information is performed based on the determined degree of necessity in that way, the user can recognize that the outside information has been detected and react to the outside information appropriately, and thus can smoothly communicate with an outside person. For example, when a degree of necessity is high, the user is directly notified of outside information, and thus the user can directly recognize the outside information and quickly respond to an outside person attempting to communicate with the user. In addition, when a degree of necessity is intermediate or low, the user is notified of outside information in stages or notified of information indicating that the outside information has been detected, and thus the user can select an action according to a situation, such as prioritizing the work that the user is doing at that time or stopping the work and immediately responding to the outside person, and therefore user convenience is further enhanced.

It should be noted that, in notification state control of the inner notification unit 130 by the notification state control unit 142, a notification state of the inner notification unit 130 may be controlled based on a degree of necessity and appropriately switched with an operation input by the user. Thus, the user who has been informed of outside information or predetermined information indicating that the outside information has been detected according to the notification state control based on the degree of necessity can change the notification state of the inner notification unit 130 by appropriately inputting a command to the notification state control unit 142 according to the content of the information. For example, with an operation input by the user, a notification state of the inner notification unit 130 may be switched to any of a state in which content information is to be notified of and a state in which the outside information is to be notified of. In addition, for example, with an operation input by the user, a notification state of the inner notification unit 130 may be switched to a state in which the content information and the outside information are superimposed and notified of. In this manner, after the user is notified of the outside information or the predetermined information indicating that the outside information has been detected according to the notification state control based on the degree of necessity, he or she can select a proper notification state according to a situation. When the user has determined that it is necessary to immediately respond to the outside information based on the information that the user is notified of, for example, he or she can switch the notification state of the inner notification unit 130 to a state in which the outside information is to be notified of, and react to the outside information appropriately. In addition, when the user has determined that the outside information may be ignored for a while based on the information that the user is notified of, for example, he or she can switch the notification state of the inner notification unit 130 to a state in which the content information will be notified of and continue his or her work. In addition, when the user has difficulty determining whether he or she should immediately respond to the outside information based on the information that he or she is notified of, for example, he or she can switch the notification state of the inner notification unit 130 to a state in which the content information and the outside information are superimposed and notified of, and continue his or her work while checking the outside situation. It should be noted that an operation input by the user for switching notification state control may be performed with, for example, a button or a switch, or by making a predetermined gesture toward a camera of the outside information detection unit 110 shown in FIG. 2.

In addition, when the necessity degree determination unit 141 determines a degree of necessity of notification of outside information, a criterion on the determination may be appropriately set by the user. For example, with the setting by the user, the necessity degree determination unit 141 may determine a degree of necessity to be high when an outside person who is approaching is a person with whom the user is acquainted (whom the user knows). By performing such a setting, the user first checks an outside image immediately when his or her acquaintance approaches, then performs an operation of appropriately switching the display screen and the audio output device of the inner notification unit 130, and thereby can select whether to continue his or her work, to communicate with the outside person, or to communicate while continuing his or her work according to a situation.

In addition, although the non-see-through HMD device 10 includes the outside information detection unit 110, the inside information detection unit 120, the inner notification unit 130, and the control unit 140 in the example illustrated in FIG. 2, the present embodiment is not limited thereto. For example, the non-see-through HMD device 10 may further have configurations of an input unit for the user to input various types of information, a storage unit for storing various types of information processed in the non-see-through HMD device 10, a communication unit for transmitting and receiving various types of information with other external devices, and the like. In addition, the non-see-through HMD device 10 may not be configured as one device, and respective functions that the non-see-through HMD device 10 has may be arbitrarily distributed to a plurality of devices. For example, only the outside information detection unit 110, the inside information detection unit 120, and the inner notification unit 130 may be mounted in a device that is worn by the user, the control unit 240 may be mounted in another device, for example, an arbitrary information processing apparatus such as a smartphone that the user has, a tablet PC, or a server installed in another place, and the device worn by the user and the information processing apparatus in which the control unit 140 is mounted may exchange various types of information with each other through an arbitrary communication line (network), and thereby various processes of the non-see-through HMD device 10 described above can be performed.

[1-3. Specific Example of Notification State]

Next, specific examples of notification state control by the notification state control unit 142 will be described in detail with reference to FIGS. 4A to 4E, 5, and 6A to 6C. It should be noted that specific examples of notification state control by the notification state control unit 142 when a degree of necessity determined by the necessity degree determination unit 141 is high, intermediate, and low will be described below.

(1-3-1. Case of High Degree of Necessity)

First, a specific example of notification state control by the notification state control unit 142 when a degree of necessity determined by the necessity degree determination unit 141 is high will be described with reference to FIGS. 4A to 4E. As described above, when a degree of necessity determined by the necessity degree determination unit 141 is high (for example, when it is equal to or higher than the first threshold value), the notification state control unit 142 causes the user to be immediately notified of outside information. This is because a high degree of necessity that the user be notified of the outside information is considered to mean that it is necessary to notify the user of the outside information quickly. With respect to control of a notification state when the user is to be immediately notified of outside information as above, switching of the display screen of the inner notification unit 130 will be mainly described with reference to FIGS. 4A to 4E.

FIGS. 4A to 4E are illustrative diagrams for describing specific examples of notification state control by the notification state control unit 142 when a degree of necessity is high. In FIGS. 4A to 4E, the display screen 510 of the inner notification unit 130 is illustrated in upper and lower parts. In addition, in the upper part, a state in which a content image 520 is displayed on the display screen 510 of the inner notification unit 130, i.e., a state of the display screen in a state in which the user is working before the user is notified of outside information, is illustrated. In addition, in the lower part, a state in which an outside image 530 is displayed on the display screen 510 of the inner notification unit 130, i.e., a state of the display screen 510 when the user has been notified of the outside information, is illustrated. It should be noted that, in the examples shown in FIGS. 4A to 4E, a case in which the outside information is information indicating that "a person has approached" and image information obtained by capturing an outside situation and sound information obtained by recording the outside situation are displayed on the display screen of the inner notification unit 130 and output from the audio output device in the form of an outside image and an outside sound as a notification of the outside information for the user will be described.

Figure 4A:
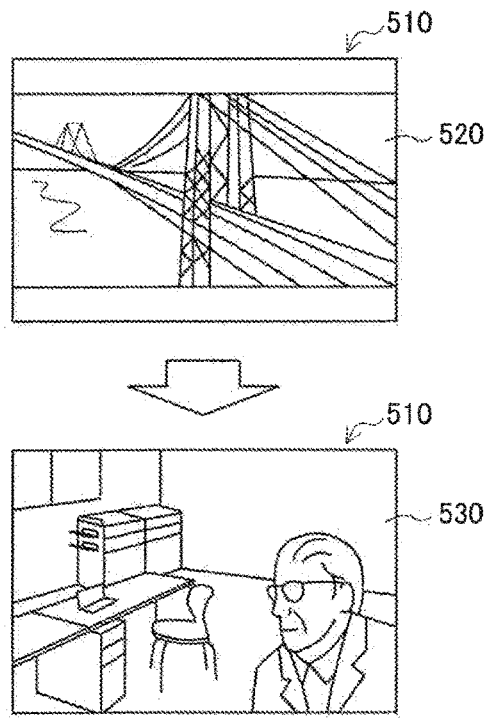
FIG. 4A is an illustrative diagram for describing a specific example of control of a notification state by a notification state control unit when a degree of necessity is high.

Referring to FIG. 4A, the state in which the content image 520 included in content information is displayed on the display screen 510 is illustrated in the upper part. In addition, in the state illustrated in the upper part, a content sound included in the content information has been output from the audio output device and the user has been notified of the sound. When the outside information is detected and a degree of necessity of the outside information is determined to be high in this state, display of the display screen 510 is switched to the outside image 530 as illustrated in the lower part. In addition, the output from the audio output device is switched from the content sound to an outside sound. In this manner, all of the display of the display screen 510 and output from the audio output device are switched to the outside image 530 and the outside sound in the example illustrated in FIG. 4A.

Figure 4B:
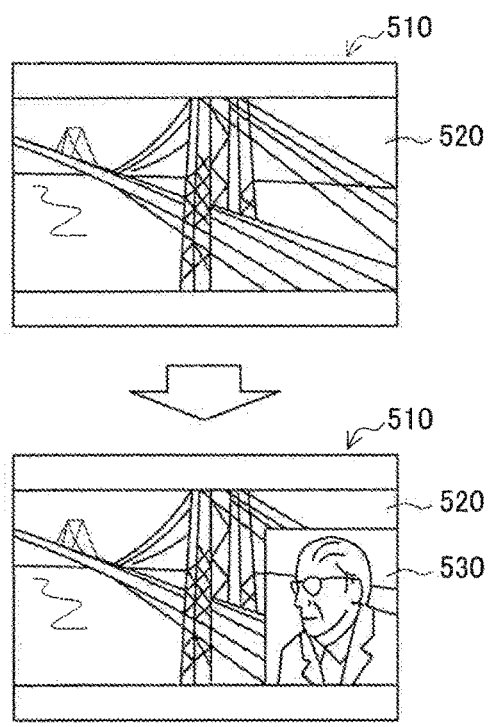
FIG. 4B is an illustrative diagram for describing a specific example of control of a notification state by a notification state control unit when a degree of necessity is high.

Another specific example of notification state control is illustrated in FIG. 4B. Referring to FIG. 4B, the state in which the content image 520 included in the content information is displayed on the display screen 510 is illustrated in the upper part. In addition, in the state illustrated in the upper part, the content sound included in the content information has been output from the audio output device and the user has been notified of the sound. When the outside information is detected and a degree of necessity of the outside information is determined to be high in this state, only an image of a person (i.e., a person who is attempting to communicate with the user) included in the outside image 530 is superimposed on the display of the content image 520 of the display screen 510 and displayed as illustrated in the lower part. In addition, the outside sound is superimposed on the content sound and output from the audio output device. In this manner, in the example illustrated in FIG. 4B, the image of the person included in the outside image 530 is superimposed on the content image 520 and displayed on the display screen 510. In addition, in the output from the audio output device, the outside sound is superimposed on the content sound and output.

Figure 4C:
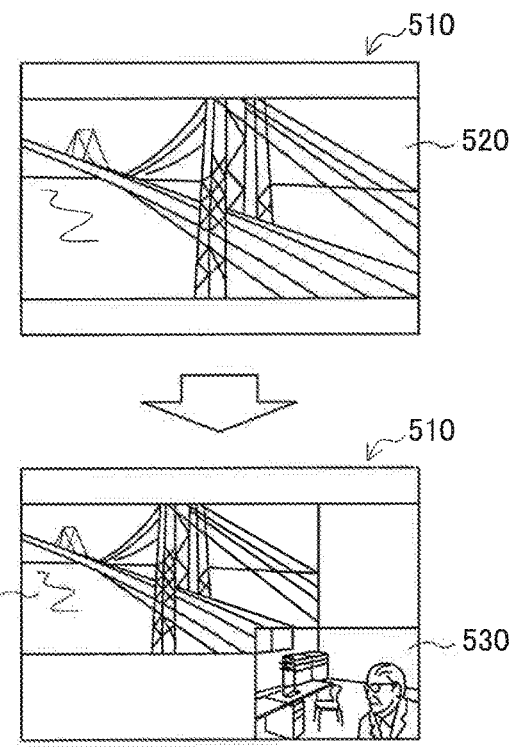
FIG. 4C is an illustrative diagram for describing a specific example of control of a notification state by a notification state control unit when a degree of necessity is high.

Another specific example of notification state control is illustrated in FIG. 4C. Referring to FIG. 4C, the state in which the content image 520 included in the content information is displayed on the display screen 510 is illustrated in the upper part. In addition, in the state illustrated in the upper part, the content sound included in the content information has been output from the audio output device and the user has been notified of the sound. When the outside information is detected and a degree of necessity of the outside information is determined to be high in this state, the display of the content image 520 of the display screen 510 is reduced, and the outside image 530 is displayed in a part of the display screen 510 as illustrated in the lower part. In addition, the outside sound is superimposed on the content sound and output from the audio output device. Here, although the content image 520 and the outside image 530 are displayed partly overlapping each other on the display screen 510 in the example illustrated in FIG. 4C, the present embodiment is not limited thereto, and the content image 520 and the outside image 530 may be displayed on the display screen 510 such that the images do not overlap. For example, the display screen 510 may be divided into two areas so that the content image 520 and the outside image 530 are each displayed in the divided areas. In this way, the content image 520 and the outside image 530 are each displayed in different areas of the display screen 510 in the example illustrated in FIG. 4C. In addition, in the output from the audio output device, the outside sound is superimposed on the content sound and output.

Figure 4D:
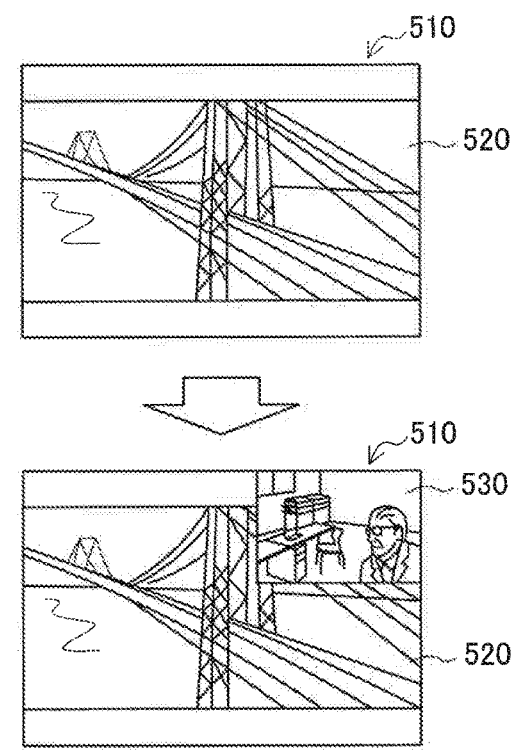
FIG. 4D is an illustrative diagram for describing a specific example of control of a notification state by a notification state control unit when a degree of necessity is high.

Another specific example of notification state control is illustrated in FIG. 4D. Referring to FIG. 4D, the state in which the content image 520 included in the content information is displayed on the display screen 510 is illustrated in the upper part. In addition, in the state illustrated in the upper part, the content sound included in the content information has been output from the audio output device and the user has been notified of the sound. When the outside information is detected and a degree of necessity of the outside information is determined to be high in this state, the outside image 530 is superimposed in a partial area of the display of the content image 520 of the display screen 510 and displayed as illustrated in the lower part. In addition, the outside sound is superimposed on the content sound and output from the audio output device. Here, a position at which the outside image 530 is superimposed on the content image 520 may be, for example, in a direction from which a person included in the outside image 530 (i.e., a person who is attempting to communicate) is approaching when the user views the image. In addition, the audio output device may output the outside sound to the user using stereophony so that he or she can hear the outside sound from a direction in which the outside sound is made. In this way, the outside image 530 is superimposed on the content image 520 and displayed on the display screen 510 in the example illustrated in FIG. 4D. In addition, in the output from the audio output device, the outside sound is superimposed on the content sound and output. Further, the outside image and the outside sound are superimposed so that the user is notified of the direction in which the outside information is detected at the same time.

Figure 4E:
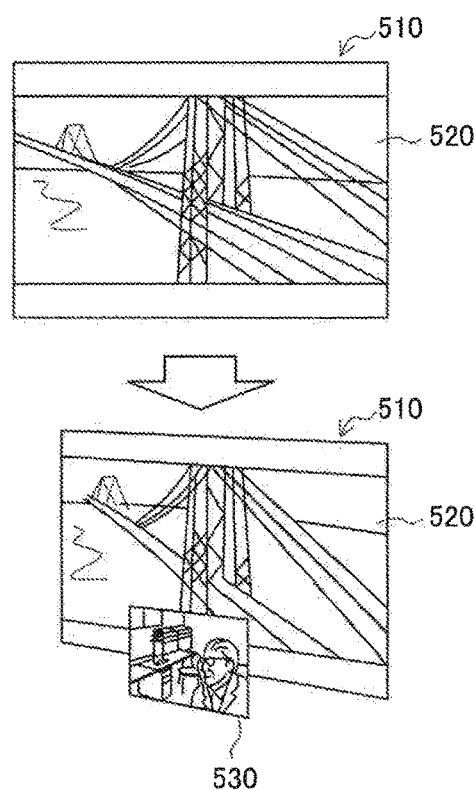
FIG. 4E is an illustrative diagram for describing a specific example of control of a notification state by a notification state control unit when a degree of necessity is high.

Another specific example of notification state control is illustrated in FIG. 4E. It should be noted that the display screen 510 can three-dimensionally display various images in the example illustrated in FIG. 4E. Referring to FIG. 4E, the state in which the content image 520 included in the content information is displayed on the display screen 510 is illustrated in the upper part. In addition, in the state illustrated in the upper part, the content sound included in the content information has been output from the audio output device and the user has been notified of the sound. When the outside information is detected and a degree of necessity of the outside information is determined to be high in this state, the outside image 530 is three-dimensionally superimposed on the display of the content image 520 of the display screen 510 and displayed. In addition, the outside sound is superimposed on the content sound and output from the audio output device. It should be noted that a position in which the outside image 530 is superimposed on the content image 520 and displayed may be arbitrarily settable by the user. In this way, with respect to the display of the display screen 510 and the output from the audio output device in the example illustrated in FIG. 4E, the outside image 530 is superimposed and displayed, and the outside sound is superimposed and output.

The specific examples of notification state control by the notification state control unit 142 when a degree of necessity determined by the necessity degree determination unit 141 is high have been described with reference to FIGS. 4A to 4E. As described above, when the degree of necessity is high, the notification state control unit 142 immediately notifies the user of the outside information. Then, the user can quickly recognize the outside information, and thus can immediately interact with the outside person in various ways and communicate with the outside person more smoothly. In addition, as illustrated in FIGS. 4A to 4E, a notification state may be switched from the state in which the content information is being notified of to the state in which the outside information is being notified of, and the state in which the outside information is being notified of may be superimposed on the state in which the content information is being notified of. Further, as in the example illustrated in FIG. 4D, the direction in which the outside information has been detected may be notified of at the same time as the outside information. Being notified of the direction in which the outside information has been detected at the same time, the user can recognize the outside information more quickly.

It should be noted that, when the outside image 530 or a partial image of the outside image 530 is superimposed on the content image 520 and displayed in the examples illustrated in FIGS. 4A to 4E, the outside image 530 and a partial image of the outside image 530 may be displayed in a transmissive manner so that the content image 520 of the superimposed portion is viewed by the user, or displayed in a non-transmissive manner so that the content image 520 of the superimposed portion is not visible to the user.

In addition, a specific notification method of outside information when a degree of necessity is high is not limited to the methods shown in FIGS. 4A to 4E. When a degree of necessity is high in the present embodiment, the user may be immediately notified of the outside information and a specific notification method thereof may be any method. In addition, a specific notification method of outside information including the methods shown in FIGS. 4A to 4E above may be arbitrarily settable by the user.

(1-3-2. Case of Intermediate Degree of Necessity)

Next, a specific example of notification state control by the notification state control unit 142 when a degree of necessity determined by the necessity degree determination unit 141 is intermediate will be described with reference to FIG. 5. When a degree of necessity determined by the necessity degree determination unit 141 is "intermediate" (for example, when it is lower than the first threshold value and equal to or higher than the second threshold value that is lower than the first threshold value), the notification state control unit 142 causes the user to be notified of outside information in stages as described above. This is because an intermediate degree of necessity that the user be notified of the outside information is considered to mean that the user need not be immediately notified of the outside information. With respect to control of a notification state when the user is notified of outside information in stages as above, switching of the display screen of the inner notification unit 130 will be mainly described with reference to FIG. 5.

FIG. 5 is an illustrative diagram for describing the specific example of notification state control by the notification state control unit 142 when a degree of necessity is intermediate.

In FIG. 5, a state in which display of the display screen 510 of the inner notification unit 130 is switched in stages is illustrated. It should be noted that, in the example illustrated in FIG. 5, a case in which outside information is information indicating that "a person has approached" and image information obtained by capturing an outside situation and sound information obtained by recording the outside situation are output from the display screen 510 and the audio output device of the inner notification unit 130 in the form of an outside image and an outside sound as a notification of the outside information to the user will be described.

Referring to FIG. 5, a state in which the content image 520 is displayed on the display screen 510 of the inner notification unit 130, i.e., a state of the display screen in a state in which the user is working before the user is notified of the outside information, is illustrated in the first part. In addition, in the state illustrated in the first part, a content sound included in content information is output from the audio output device and the user is notified of the sound.

When the outside information is detected and a degree of necessity of the outside information is determined to be intermediate in this state, a light pattern 540 is superimposed on a partial area of the display of the content image 520 of the display screen 510 and displayed as illustrated in the second part of FIG. 5. The light pattern 540 may be, for example, a pattern in which light having a circular shape is emitted, or may be set to flicker on the display screen 510. The light pattern 540 is information indicating that the outside information has been detected. Thus, by visually recognizing the light pattern 540 displayed on the display screen 510, the user can recognize that the outside information has been detected.

When a predetermined time elapses in the state in which the light pattern 540 is displayed on the display screen 510, an outside sound is superimposed on a content sound and output from the audio output device with the superimposed light pattern 540 displayed on the display screen 510 as illustrated in the third part of FIG. 5. Thus, the user can recognize sound information of the outside information.

When a predetermined time elapses again in the state illustrated in the third part of FIG. 5, the display of the light pattern 540 disappears with the outside sound superimposed on the content sound and output from the audio output device, and the outside image 530 is superimposed in a partial area of the display of the content image 520 and displayed on the display screen 510 as illustrated in the fourth part of FIG. 5. It should be noted that the display of the light pattern 540 may also continue in the state illustrated in the fourth part. Thus, the user can recognize the image information and sound information of the outside information. Moreover, in the state illustrated in the fourth part, the outside image 530 may be displayed in a transmissive manner so that the content image 520 of the superimposed portion is viewed by the user, or displayed in a non-transmissive manner so that the content image 520 of the superimposed portion is not visible to the user.

The specific example of notification state control by the notification state control unit 142 when the degree of necessity determined by the necessity degree determination unit 141 is intermediate has been described above with reference to FIG. 5. When the degree of necessity is intermediate, the notification state control unit 142 causes the user to be notified of the outside information in stages as described above. In the example illustrated in FIG. 5, the user is first notified of the information indicating that the outside information has been detected through display of the light pattern 540, then notified of the outside sound, and finally notified of the outside image. In addition, time taken to transition from the stage illustrated in the second part to the stage illustrated in the third part and time taken to transition from the stage illustrated in the third part to the stage illustrated in the fourth part may be appropriately set by the user. Further, in each stage illustrated in FIG. 5, a notification state of the inner notification unit 130 may be controlled with an operation input from the user. For example, in each stage illustrated in FIG. 5, whether to continue a notification process of the outside information without change, whether to stop the notification process of the outside information in the current stage, whether to stop the notification process of the outside information and switch to the notification state of the inner notification unit 130 to a state in which notification of the content information is performed, whether to switch the notification state of the inner notification unit 130 to a state in which notification of the outside information is performed, or the like may be appropriately selected with an operation input from the user. The operation input from the user for the selection may be performed with, for example, a button or a switch, or by making a predetermined gesture toward the camera of the outside information detection unit 110 shown in FIG. 2. Thus, the user can select whether to respond to the outside information or to ignore the outside information for the moment to concentrate on work according to a situation, and thus user convenience is enhanced. In addition, a specific notification method of outside information when a degree of necessity is intermediate is not limited to the method shown in FIG. 5. In the present embodiment, when a degree of necessity is intermediate, the user may be notified of the outside information in stages to be able to select whether to respond to the outside information, and a specific notification method in this case may be any method. Furthermore, specific notification methods of outside information including the method shown in FIG. 5 may be appropriately settable by the user.

(1-3-3. Case of Low Degree of Necessity)

Next, specific examples of notification state control by the notification state control unit 142 when a degree of necessity determined by the necessity degree determination unit 141 is low will be described with reference to FIGS. 6A to 6C. When a degree of necessity determined by the necessity degree determination unit 141 is "low" (for example, when it is lower than the second threshold value), the notification state control unit 142 causes the user to be notified of the predetermined information indicating that the outside information has been detected as described above. This is because a low degree of necessity that the user be notified of the outside information is considered to mean that the user need not be immediately notified of the outside information. With respect to notification state control when the user is notified of the predetermined information indicating that the outside information has been detected, switching the display screen of the inner notification unit 130 will be mainly described with reference to FIGS. 6A to 6C.

Figure 6A:
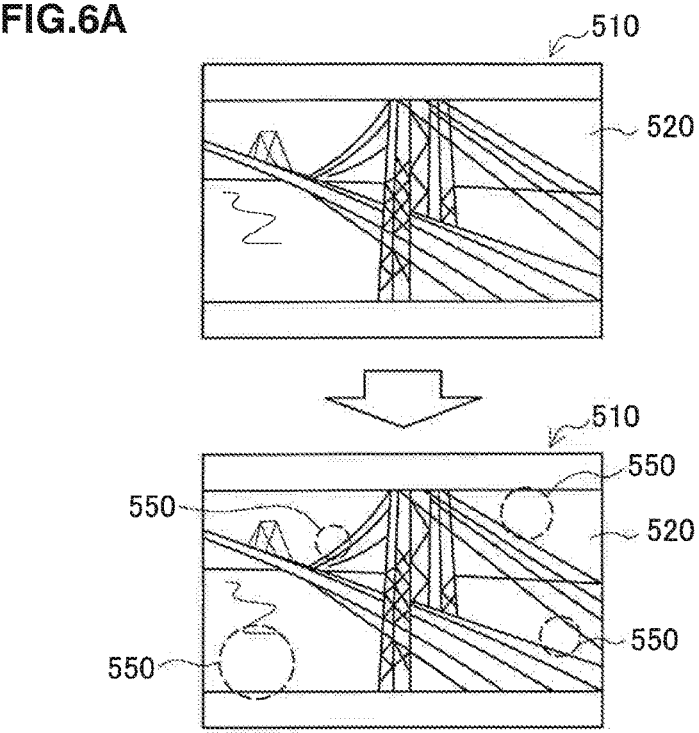
FIG. 6A is an illustrative diagram for describing a specific example of notification state control by the notification state control unit when a degree of necessity is low.
Figure 6B:
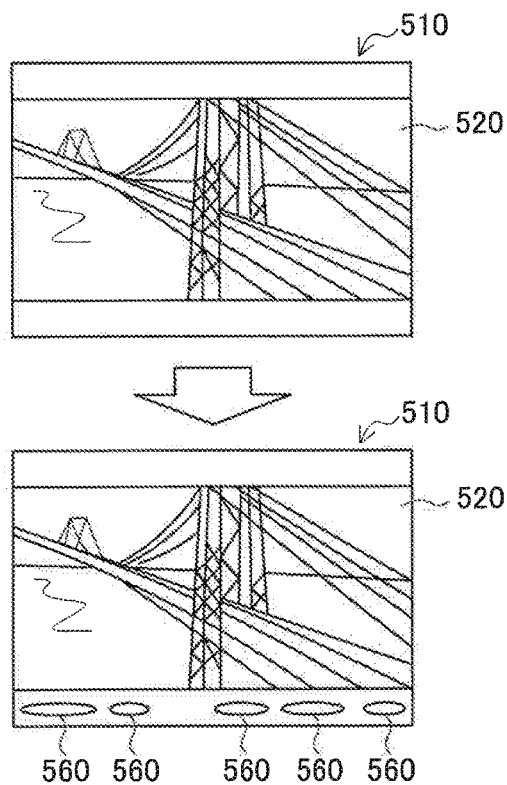
FIG. 6B is an illustrative diagram for describing a specific example of notification state control by the notification state control unit when a degree of necessity is low.
Figure 6C:
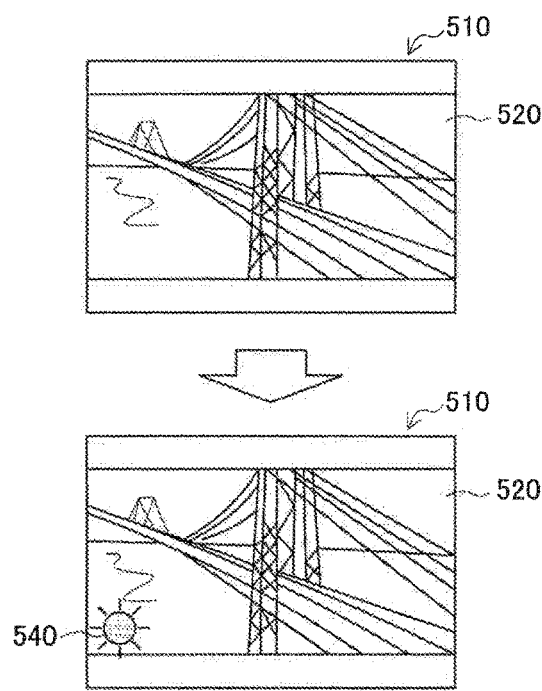
FIG. 6C is an illustrative diagram for describing a specific example of notification state control by the notification state control unit when a degree of necessity is low.

FIGS. 6A to 6C are illustrative diagrams for describing specific examples of notification state control by the notification state control unit 142 when a degree of necessity is low. In FIGS. 6A to 6C, the display screen 510 of the inner notification unit 130 is illustrated in each upper part and lower part. In addition, a state of the content image 520 being displayed on the display screen 510 of the inner notification unit 130, i.e., a state of the display screen when the user is working before the user is notified of outside information is illustrated in the upper part. In addition, a state of a predetermined image being displayed on the display screen 510 of the inner notification unit 130 indicating that the outside information has been detected is illustrated in the lower part.

Referring to FIG. 6A, the state of the content image 520 included in content information being displayed on the display screen 510 is illustrated in the upper part. In addition, in the state illustrated in the upper part, a content sound included in the content information is output from the audio output device and the user is notified of the sound. When the outside information is detected in this state and a degree of necessity of the outside information is determined to be low, circular patterns 550 depicted with dashed lines are superimposed on the display of the content image 520 and displayed on the display screen 510 as illustrated in the lower part. The number of circular patterns 550 displayed may correspond, for example, to the number of pieces of outside information detected in a direction in which the outside information has been detected when the user views the screen. In addition, the circular patterns 550 may be larger when they are closer to the position of the user at which the outside information corresponding to the pattern has been detected. By visually recognizing that the circular patterns 550 are displayed on the display screen 510, the user can recognize that any type of outside information has been detected. In addition, by visually recognizing display positions and displayed sizes of the circular patterns 550, the user can qualitatively recognize the detected directions and detected distances of the outside information.

Referring to FIG. 6B, the state of the content image 520 included in the content information being displayed on the display screen 510 is illustrated in the upper part. In addition, in the state illustrated in the upper part, the content sound included in the content information is being output from the audio output device and the user is being notified of the sound. When the outside information is detected in this state and a degree of necessity of the outside information is determined to be low, elliptical patterns 560 are displayed in a non-display area of the content image 520 on the display screen 510 as illustrated in the lower part. The number of elliptical patterns 560 displayed may correspond, for example, to the number of pieces of outside information detected in the left-right direction in which the outside information has been detected when the user views the screen. In addition, the elliptical patterns 560 may be larger when they are closer to the position of the user at which the outside information corresponding to the pattern has been detected. By visually recognizing that the elliptical patterns 560 are displayed on the display screen 510, the user can recognize that any type of outside information has been detected. In addition, by visually recognizing display positions and displayed sizes of the elliptical patterns 560, the user can qualitatively recognize the detected directions and detected distances of the outside information.

Referring to FIG. 6C, the state of the content image 520 included in the content information displayed on the display screen 510 is illustrated in the upper part. In addition, in the state illustrated in the upper part, the content sound included in the content information is output from the audio output device and the user is notified of the sound. When the outside information is detected in this state and a degree of necessity of the outside information is determined to be low, the light pattern 540 is superimposed on a partial area of the display of the content image 520 and displayed on the display screen 510 as illustrated in the lower part. The light pattern 540 is the same as the light pattern 540 described with reference to the drawing of the second part of FIG. 5. The light pattern 540 may be, for example, a pattern emitting light having a circular shape, or may be displayed on the display screen 510 while flickering. In addition, the light pattern 540 may be displayed in a direction, for example, in which the outside information has been detected when the user views the screen. By visually recognizing that the light pattern 540 is displayed on the display screen 510, the user can recognize that any type of outside information has been detected. In addition, by visually recognizing a display position of the light pattern 540, the user can qualitatively recognize the detected direction of the outside information.

The specific examples of notification state control by the notification state control unit 142 when a degree of necessity determined by the necessity degree determination unit 141 is low have been described above with reference to FIGS. 6A to 6C. As described above, when a degree of necessity is low, the notification state control unit 142 causes the user to be notified of predetermined information which indicates that outside information has been detected. According to the examples illustrated in FIGS. 6A to 6C, by displaying the circular patterns 550, the elliptical patterns 560, or the light pattern 540 on the display screen 510 as the predetermined information which indicates that outside information has been detected, the user is notified of the information. In addition, in each state illustrated in FIGS. 6A to 6C, a notification state of the inner notification unit 130 may be controlled with an operation input from the user. For example, in each state illustrated in FIGS. 6A to 6C, whether to continue the notification process for the predetermined information indicating that the outside information has been detected without change, whether to stop the notification process for the predetermined information indicating that the outside information has been detected and switch the notification state of the inner notification unit 130 to a state in which the user is notified of the content information, or whether to switch the notification state of the inner notification unit 130 to a state in which the user is notified of the outside information may be appropriately selected with an operation input from the user. The operation input from the user for the selection may be performed, for example, with a button or a switch, or may be performed by performing a predetermined gesture toward the camera of the outside information detection unit 110 shown in FIG. 2. Thus, the user can select whether to respond to the outside information or to ignore the outside information for the moment to concentrate on work according to a situation, and therefore user convenience is further enhanced. In addition, since the user is notified only of the predetermined information indicating that the outside information has been detected in the methods shown in FIGS. 6A to 6C, the notification of the content information for the user is not disturbed in comparison to the method shown in FIG. 5. Accordingly, the user is notified only of the fact that the outside information has been detected without his or her work being interrupted, and thus, when the user determines that it is not necessary to respond to the outside information, the user can be left alone to concentrate on the work. It should be noted that a specific notification method of outside information when a degree of necessity is low is not limited to the methods shown in FIGS. 6A to 6C. In the present embodiment, the user may be notified of the predetermined information indicating that the outside information has been detected when a degree of necessity is low and may select whether to respond to the outside information, and a specific notification method thereof may be any method. For example, by superimposing a predetermined sound, for example, a sound of a buzzer or an alarm on the output of the content sound and outputting the sound from the audio output device of the inner notification unit 130, the user may be notified of the fact that the outside information has been detected. In addition, a specific notification method for notifying the user of detection of the outside information including the methods shown in FIGS. 6A to 6C may be appropriately set by the user.

The specific examples of notification state control by the notification state control unit 142 have been described above in detail with reference to FIGS. 4A to 4E, 5, and 6A to 6C. It should be noted that the specific examples described above are merely examples of notification state control in the present embodiment, and a specific method thereof is not limited to the above-described methods as long as proper notification state control is performed according to a degree of necessity.

For example, when an outside person who attempts to communicate with the user is specified as an individual based on an image of the face of the outside person among image information included in outside information, ID information of the outside person among device information included in the outside information, or the like, information such as the name of the person may be superimposed on the image of the person in the outside image 530 and displayed on the display screen 510. In addition, when a person who attempts to communicate with the user is a person with whom the user is connected on an SNS, information indicating the SNS (for example, a mark indicating the type of SNS or the like) is superimposed on the image of the person in the outside image 530 and displayed.

In addition, notification state control by the notification state control unit 142 may be switched based on detected outside information, in addition to a degree of necessity. For example, in the present embodiment, when specific outside information indicating an emergency is detected, a degree of necessity of the outside information is determined to be high as described in [1-2. Configuration of notification state control device] above; however, it is necessary to notify the user of such outside information immediately and more reliably. Thus, when such specific outside information indicating an emergency is detected, a display of the display screen 510 and an output of the audio output device of the inner notification unit 130 may be instantly switched to an outside image and an outside sound as introduced in FIG. 4A.

In addition, although the case in which, when a degree of necessity determined by the necessity degree determination unit 141 is low, for example, the notification state control unit 142 notifies the user of the predetermined information indicating that the outside information has been detected has been described above, the present embodiment is not limited thereto. For example, when a degree of necessity is low, the display of the display screen and audio output of the inner notification unit 130 may not be changed, i.e., the user may not be notified of the outside information. In addition, when a degree of necessity is low, whether or not the user is notified of the predetermined information indicating that the outside information has been detected may be appropriately set by the user. Thus, when the user wants to concentrate on his or her work and a degree of necessity is low, the user can set not to be notified of even the fact that the outside information has been detected, and thus he or she can further decrease interruptions to the work.

In addition, as described above, in order to determine a degree of necessity of notification of outside information by the necessity degree determination unit 141, a criterion of the determination may be appropriately set by the user. Further, a specific notification state of the outside information according to a degree of necessity by the notification state control unit 142 may be appropriately set by the user according to types of outside information, including the methods shown in FIGS. 4A to 4E, 5, and 6A to 6C. For example, when specific outside information has been detected, the user may set a criterion of determination of the necessity degree determination unit 141 so that a degree of necessity of the notification is determined to be high, and further appropriately set a specific method of notification state control thereof by the notification state control unit 142 from the methods of FIGS. 4A to 4E described as specific examples of notification state control when a degree of necessity is high. Specifically, when the user thinks that he or she wants to communicate with an acquaintance promptly when a person with whom the user is acquainted (an acquaintance) approaches, for example, the user can set a process of the necessity degree determination unit 141 and the notification state control unit 142 such that the necessity degree determination unit 141 determines a degree of necessity to be high and the notification state control unit 142 switches a notification state of the inner notification unit 130 to an outside image and an outside sound as illustrated in FIG. 4A when the outside person who has approached is an acquaintance of the user. In addition, for example, when the user thinks that he or she wants to first check the outside state when a person with whom the user is acquainted (an acquaintance) approaches, the user can set the process of the necessity degree determination unit 141 and the notification state control unit 142 such that the necessity degree determination unit 141 determines a degree of necessity to be high and the notification state control unit 142 switches the notification state of the inner notification unit 130 to the state in which a content image and content sound and an outside image and outside sound are displayed and output as illustrated in FIGS. 4B to 4E when the outside person who has approached is an acquaintance of the user. Further, in this case, after the user checks the outside information that the user has been notified of with the content information superimposed thereon, he or she may perform an operation of appropriately switching the display screen and the audio output device of the inner notification unit 130, and select whether to continue his or her work, communicate with the outside person, or communicate while continuing the work according to a situation. As the user can set the criterion of the determination of a degree of necessity by the necessity degree determination unit 141 and a notification state by the inner notification unit 130 according to the degree of necessity in this manner, detailed notification state control reflecting thoughts and intentions of the user can be performed.

[1-4. Processing Procedure of Notification State Control Method]

Figure 7:
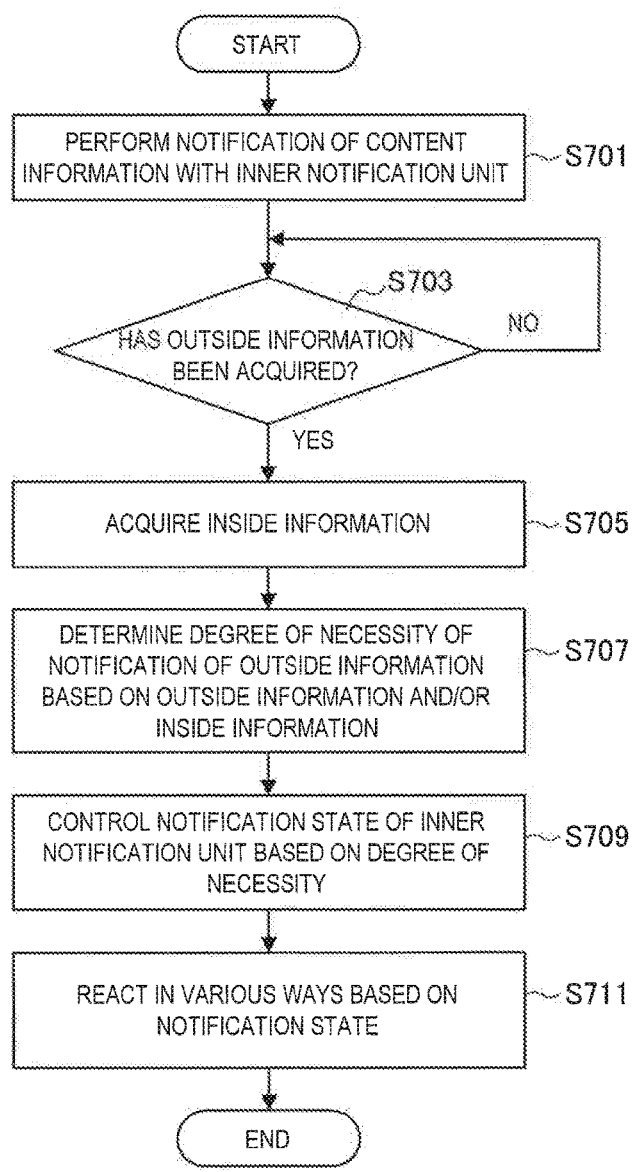
FIG. 7 is a flow chart showing the processing procedure of a notification state control method according to the first embodiment of the present disclosure.

Next, a processing procedure of a notification state control method according to the first embodiment of the present disclosure will be described with reference to FIG. 7. FIG. 7 is a flow chart showing the processing procedure of the notification state control method according to the first embodiment of the present disclosure. It should be noted that, since the functions and configurations of the outside information detection unit 110, the inside information detection unit 120, the inner notification unit 130, and the control unit 140 have been described with reference to FIG. 2, detailed description thereof will be omitted in the following description regarding the processing procedure of the notification state control method.

First, in Step S701, the user is notified of content information by the inner notification unit 130. Specifically, a content image included in the content information is displayed on the display screen of the inner notification unit 130, and a content sound included in the content information is output by the audio output device of the inner notification unit 130. That is to say, the state of Step S701 is a state in which the user is working.

Next, in Step S703, whether or not outside information has been detected is determined. The determination may be performed by the necessity degree determination unit 141 based on, for example, outside information transmitted from the outside information detection unit 110. In addition, the determination of whether or not the outside information has been detected mentioned here may be determination of whether there is a change in outside information detected by the outside information detection unit 110. When it is determined that no outside information has been detected, notification of the content information is continued without change until outside information is determined to be detected. When it is determined that outside information has been detected, the process proceeds to Step S705.

In Step S705, inside information is acquired by the inside information acquisition unit 143. Specifically, the inside information acquisition unit 143 may command the inside information detection unit 120 to detect inside information, and the inside information detected by the inside information detection unit 120 based on the command may be acquired by the inside information acquisition unit 143. However, when no inside information is used in a determination process of a degree of necessity by the necessity degree determination unit 141 in Step S707 to be described below, the process of Step S705 may be omitted.

Next, in Step S707, the necessity degree determination unit 141 determines a degree of necessity of notification of the outside information with respect to the user based on the outside information and/or inside information. The degree of necessity may be expressed by several grades such as "high," "intermediate," and "low" as described in [1-2. Configuration of notification state control device] described above, or by scores.

Next, in Step S709, the notification state control unit 142 controls a notification state of the inner notification unit 130 based on the degree of necessity determined by the necessity degree determination unit 141 in Step S707. Specifically, the notification state control unit 142 performs notification state control based on the degree of necessity, for example, as described in [1-3. Specific example of notification state] described above.

Finally, in Step S711, the user interacts with the outside in various ways based on the notification state controlled in Step S709. Specifically, since the user is immediately notified of outside information when the degree of necessity is high, the user can communicate with the outside person through the non-see-through HMD device 10 or by taking off the non-see-through HMD device 10. In addition, since the user is notified of the outside information in stages when the degree of necessity is intermediate, the user can select a reaction according to a situation, such as communicating with the outside person promptly, or communicating with the outside person after finishing more of his or her work. Further, since the user is not notified of the outside information as is but is notified of the fact that the outside information has been detected when the degree of necessity is low, the user can select an reaction according to a situation, such as communicating with the outside person promptly, or ignoring the outside person for the moment to continue his or her work.

The processing procedure of the notification state control method according to the first embodiment of the present disclosure has been described above with reference to FIG. 7.

2. Second Embodiment

Next, a second embodiment of the present disclosure will be described. It should be noted that the second embodiment of the present disclosure corresponds to a configuration in which some functions and configurations are added to the configuration of the first embodiment described above. Thus, differences from the first embodiment will be mainly described in the description relating to the second embodiment below, and overlapping detailed description with functions and configurations of the first embodiment will be omitted.

[2-1. Exterior of Non-See-Through HMD Device]

Figure 8A:
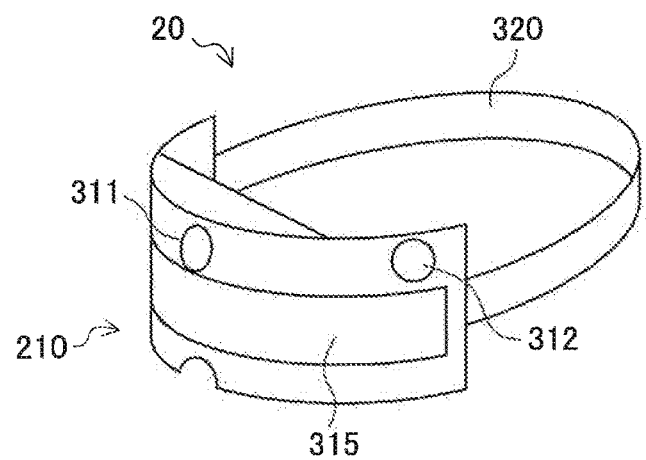
FIG. 8A is a perspective diagram illustrating an example of the exterior of a non-see-through HMD device according to a second embodiment of the present disclosure.
Figure 8B:
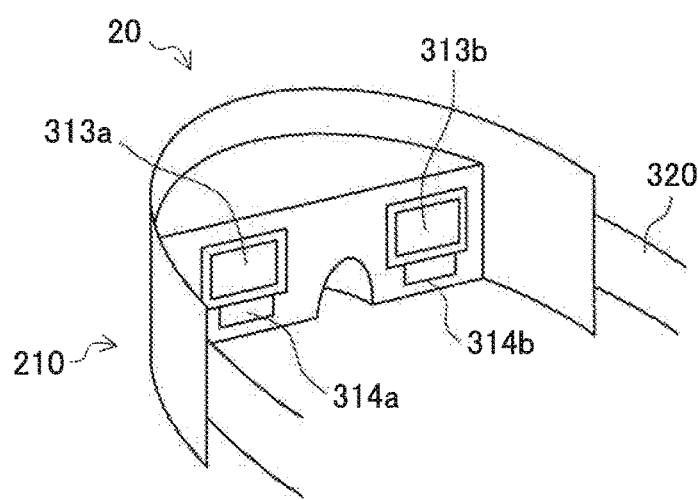
FIG. 8B is a perspective diagram illustrating an example of the exterior of a non-see-through HMD device according to a second embodiment of the present disclosure.

First, an example of the exterior of a non-see-through HMD device according to the second embodiment of the present disclosure will be described with reference to FIGS. 8A and 8B. FIGS. 8A and 8B are perspective diagrams illustrating the example of the exterior of the non-see-through HMD device according to the second embodiment of the present disclosure.

FIG. 8A is a perspective diagram illustrating a state of the non-see-through HMD device 20 according to the second embodiment when viewed from the outside. In addition, FIG. 8B is a perspective diagram illustrating a state of the non-see-through HMD device 20 according to the second embodiment when viewed from the inside. Referring to FIGS. 8A and 8B, the non-see-through HMD device 20 has a main body part 210 and the band part 320. Here, the non-see-through HMD device 20 illustrated in FIGS. 8A and 8B corresponds to a configuration of the non-see-through HMD device 10 illustrated in FIGS. 1A and 1B in which an outer display unit 315 is added to an outside of a goggle-like portion of the main body part 310 and the function of the control unit (not illustrated) provided in the main body part 210 is changed. Thus, functions and configurations of the camera 311, the microphone 312, the inner display units 313a and 313b, the line-of-sight sensor units 314a and 314b, and the band part 320 provided in the main body part 310 of the non-see-through HMD device 20 are the same as those of the members of the non-see-through HMD device 10 described with reference to FIGS. 1A and 1B, and thus detailed description thereof will be omitted.

Referring to FIG. 8A, the outer display unit 315 for visually presenting various types of information to the outside is provided on the surface of the goggle-like portion of the main body part 310 facing the outside. The outer display unit 315 has a display screen facing the outside as illustrated in FIG. 8A to display various types of information on the display screen in various forms such as images, text, graphs, tables, and the like to visually present the information to the outside. However, a form of the outer display unit 315 is not limited to the form in which the display screen is included as illustrated in FIG. 8A, and the outer display unit 315 is applicable as long as it can visually present various types of information. For example, the outer display unit 315 may be one or a plurality of lamps such as light emitting diodes (LEDs), and may present information according to driving of the lamp such as with the lamp emitting light in different colors, emitting light that flickers at different rates, emitting light with different degrees of brightness, or with only predetermined lamps emitting light. In addition, although not illustrated in FIGS. 8A and 8B, the non-seethrough HMD device 20 may have an audio output unit such as a speaker device that auditorily presents various types of information to the outside.

The example of the exterior of the non-see-through HMD device 20 according to the second embodiment of the present disclosure has been described above with reference to FIGS. 8A and 8B. As described above, the non-see-through HMD device 20 according to the second embodiment as the configuration for presenting various types of information to the outside, such as the outer display unit 315 and the audio output unit, in addition to the configuration of the non-see-through HMD device 20 according to the first embodiment. Here, in the second embodiment, a notification state in which the user is notified of outside information is switched by the control unit provided in the main body part 210 based on the detected outside information as in the first embodiment. Notifying the user of information may include notifying the user of the information visually by displaying the information on the display screens of the inner display units 313*a* and 313*b* as an image or auditorily by outputting the information from the audio output unit as a sound. Furthermore, in the second embodiment, a presentation state in which information indicating a response of the user to outside information (hereinafter also referred to as user response information) is presented to the outside of the user is switched based on a notification state of outside information with respect to the user. Presenting information to the outside of the user may include presenting the information to the outside of the user visually by displaying the information on the display screen of the outer display unit 315 as an image or auditorily by outputting the information from the audio output unit to the outside as a sound.

As described above, the non-see-through HMD device 20 according to the second embodiment can also be said to be a presentation state control device which controls a presentation state of user response information with respect to the outside. In the following description, a series of processes in presentation state control performed by the non-see-through HMD device 20 will be referred to as a presentation state control process. In addition, in the following description, the non-see-through HMD device 20 will also be referred to as an information processing device 20 because the non-see-through HMD device 20 performs various information processes in a presentation state control process.

[2-2. Configuration of Non-See-Through HMD Device]

Next, a configuration of the non-see-through HMD device 20 according to the second embodiment of the present disclosure will be described with reference to FIG. 9. FIG. 9 is a functional block diagram illustrating an example of the configuration of the non-see-through HMD device 20 according to the second embodiment of the present disclosure. Referring to FIG. 9, the non-see-through HMD device 20 according to the second embodiment has the outside information detection unit 110, the inside information detection unit 120, the inner notification unit 130, an outer presentation unit 250, and a control unit 240. It should be noted that, since the functions and configurations of the outside information detection unit 110, the inside information detection unit 120, and the inner notification unit 130 of the configuration of the non-see-through HMD device 20 are the same as those of the outside information detection unit 110, the inside information detection unit 120, and the inner notification unit 130 of the non-see-through HMD device 10 according to the first embodiment described with reference to FIG. 2, detailed description thereof will be omitted. In the description regarding the configuration of the non-see-through HMD device 20 below, functions and configurations of the outer presentation unit 250 and the control unit 240 which are differences from the non-see-through HMD device 10 according to the first embodiment will be mainly described.

Driving of the outer presentation unit 250 is controlled by the control unit 240, and the outer presentation unit 250 presents information indicating a response of the user to outside information to the outside of the user. Here, presentation of information to the outside includes visual presentation and auditory presentation. For example, the outer presentation unit 250 has a display screen for displaying user response information on the display screen in various forms such as images, text, graphs, and tables, thereby visually presenting the information to the outside of the user. In addition, the outer presentation unit 250 has an audio output device such as a speaker for outputting the user response information from the audio output device as a sound, thereby auditorily presenting the information to the outside of the user. As described above, the outer presentation unit 250 may serve as a display unit which displays the user response information on the display screen and as an audio output unit which outputs the user response information as a sound. It should be noted that the configuration of the outer presentation unit 250 serving as the display unit corresponds to the configuration of the outer display unit 315 illustrated in FIG. 9A, and the display screen is positioned in front of the eyes of the user and provided on the surface facing the outside.

The control unit 240 comprehensively controls the non-see-through HMD device 20 and performs various information processes in the presentation state control process according to the present embodiment. The function and the configuration of the control unit 240 will be described in detail below.

The control unit 240 has the necessity degree determination unit 141, the notification state control unit 142, the inside information acquisition unit 143, an awareness degree determination unit 244, and a presentation state control unit 245. It should be noted that, in the configuration of the control unit 240 of the non-see-through HMD device 20, functions and configurations of the necessity degree determination unit 141, the notification state control unit 142, and the inside information acquisition unit 143 are the same as those of the necessity degree determination unit 141, the notification state control unit 142, and the inside information acquisition unit 143 of the control unit 140 of the non-see-through HMD device 10 according to the first embodiment described with reference to FIG. 2. That is to say, in the second embodiment, the necessity degree determination unit 141 determines a degree of necessity that the user be notified of outside information based on the outside information which indicates a situation external to the user, and the notification state control unit 142 switches a notification state of the outside information with respect to the user based on the determined degree of necessity as in the first embodiment. In this manner, a degree of necessity that the user be notified of outside information is determined and a notification state of the outside information is controlled based on the determined degree of necessity in the second embodiment as well.

Thus, in the following description regarding the configuration of the non-see-through HMD device 20, detailed description of the functions and configurations of the necessity degree determination unit 141, the notification state control unit 142, and the inside information acquisition unit 143 in the configuration of the control unit 240 of the non-see-through HMD device 20 will be omitted, and the functions and configurations of the awareness degree determination unit 244 and the presentation state control unit 245 which is a difference from the non-see-through HMD device 10 according to the first embodiment will be mainly described. However, in the second embodiment, the notification state control unit 142 transmits information regarding a notification state of outside information to the awareness degree determination unit 244 and the presentation state control unit 245. In addition, in the second embodiment, the inside information acquisition unit 143 may transmit acquired inside information to the awareness degree determination unit 244 and the presentation state control unit 245, in addition to the necessity degree determination unit 141.

The awareness degree determination unit 244 determines a degree of awareness of the user with respect to outside information based on at least any of a notification state switched by the notification state control unit 142 and inside information acquired by the inside information acquisition unit 143. A degree of awareness of a user with respect to outside information is an index which indicates a degree to which the user is aware of the outside information. For example, when a notification state of outside information to the user is a state in which the user was immediately notified of the outside information as illustrated in FIGS. 4A to 4E, the user was overtly notified of the outside information by the inner notification unit 130, and thus a degree of awareness of the user with respect to the outside information is considered to be relatively high. In addition, when a notification state of outside information with respect to the user is a state in which the user has not been notified of outside information, i.e., a state in which the user has been notified only of content information by the inner notification unit 130, the user is considered not to be aware of the outside information, and thus a degree of awareness of the user with respect to the outside information should be determined to be very low. In this manner, the awareness degree determination unit 244 can relatively determine a degree of awareness of the user with respect to outside information based on a notification state of the outside information with respect to the user switched by the notification state control unit 142.

In addition, when the awareness degree determination unit 244 determines a degree of awareness of the user with respect to outside information based on inside information, the awareness degree determination unit 244 can determine the degree of awareness based on, for example, biological information or line-of-sight information of the user included in the inside information. For example, when information indicating that the eyes of the user are closed is detected as line-of-sight information, even if an outside image included in outside information is displayed on the display screen of the inner notification unit 130, there is considered to be a high possibility that the user is not aware of the outside information, and thus the awareness degree determination unit 244 can determine the degree of awareness of the user with respect to the outside information to be relatively low.

In addition, when an outside image included in outside information is displayed in a partial area of the display screen 510 of the inner notification unit 130 as illustrated in FIGS. 4B to 4D, for example, a degree of awareness of the user with respect to the outside information may be determined based on line-of-sight information indicating whether or not the line of sight of the user is directed toward the area in which the outside image is being displayed on the display screen of the inner notification unit 130. For example, when a person who is attempting to communicate with the user is projected in the outside image and the line of sight of the user is not directed toward the outside image displayed in the partial area of the display screen 510 of the inner notification unit 130, the user is considered to be able to recognize that there is a person attempting to communicate with him or her, but not to be able to recognize who the person is. Thus, in such a case, the awareness degree determination unit 244 can determine a degree of awareness of the user with respect to the outside information to be relatively low. On the other hand, when a person who is attempting to communicate with the user is projected in the outside image and the line of sight of the user is directed toward the outside image displayed in a partial area of the display screen 510 of the inner notification unit 130, the user is considered to be able to recognize that there is a person attempting to communicate with him or her and to recognize who the person is. Thus, in such a case, the awareness degree determination unit 244 can determine a degree of awareness of the user with respect to the outside information to be relatively high.

In addition, for example, the awareness degree determination unit 244 may determine a degree of awareness based on content information included in inside information. Specifically, when the user is notified of outside information in stages or of information indicating that the outside information has been detected as illustrated in FIGS. 5 and 6A to 6C, for example, a degree of immersion of the user in content may be determined based on biological information of the user and/or content information, and based on the degree of immersion, a degree of awareness of the user with respect to the outside information may be determined. For example, when a degree of immersion in the content is high, in a state in which the user is being notified of the outside information in stages or information indicating that the outside information has been detected, there is a possibility of the user not paying attention to the notifications, and thus the awareness degree determination unit 244 can determine a degree of awareness of the user with respect to the outside information to be relatively low. Here, determination of a degree of immersion by the awareness degree determination unit 244 may be determined based on, for example, information regarding a posture (for example, inclination of the neck), a motion of the head, or the like of the user acquired from motion information, information of a pulse, a heartbeat, line-of-sight information of the user acquired from biological information, and/or information regarding each scene and "a degree of intensity" acquired from content information as in the determination of a degree of immersion by the necessity degree determination unit 141 described in [1-2. Configuration of non-see-through HMD device] above.

It should be noted that the awareness degree determination unit 244 may determine a degree of awareness by, for example, preparing a table in which types of notification state and inside information are associated with degrees of awareness and referring to the table as in the determination process of a degree of necessity by the necessity degree determination unit 141. In addition, the awareness degree determination unit 244 may determine a degree of awareness based on a predetermined score assigned to each type of notification state and inside information.

When a degree of awareness of the user with respect to outside information is determined by several grades or scores, an awareness state of the user with respect to the outside information can be expressed in more detail, such as a "state in which the user has recognized that the outside information was detected but not recognized the content of the outside information" in addition to the alternative states of the user "aware" and "unaware" of the outside information.

The presentation state control unit 245 switches a presentation state in which information indicating a response of the user to the outside information is presented to the outside of the user based on a notification state switched by the notification state control unit 142. Here, presenting user response information to the outside may include presenting the user response information to the outside visually by displaying the user response information on the display screen of the outer presentation unit 250 as an image or auditorily by outputting the user response information from the audio output device of the outer presentation unit 250 as a sound. In addition, the user response information also includes information regarding whether or not the user is responding to the outside information, i.e., whether or not the user has recognized the outside information.

In addition, control of a presentation state may be control of switching a presentation state of the user response information to the outside. For example, the notification state control unit 142 performs different types of notification state control according to degrees of necessity as illustrated in FIGS. 4A to 4E, 5, and 6A to 6C. The presentation state control unit 245 may control a presentation state according to different notification states according to the degrees of necessity. For example, when a notification state of outside information with respect to the user is a state in which the user is being immediately notified of the outside information as illustrated in FIGS. 4A to 4E, the user is being overtly notified of an outside image included in the outside information through the display screen of the inner notification unit 130, and thus the presentation state control unit 245 displays information indicating that the user is viewing the outside image on the display screen of the outer presentation unit 250. As the information indicating that the user is viewing the outside image, a pattern resembling the eyes of the user may be displayed on the display screen of the outer presentation unit 250 in the present embodiment.

In addition, when the notification state of the outside information with respect to the user is a state in which the user has not been notified of the outside information, for example, the user is not viewing the outside image included in the outside information, and thus the presentation state control unit 245 displays information indicating that the user is not viewing the outside information on the display screen of the outer presentation unit 250. As the information indicating that the user is not viewing the outside information, for example, a cross mark, a string of letters indicating the state, or the like may be displayed on the display screen of the outer presentation unit 250. In the present embodiment, since the information indicating that the user is viewing or not viewing the outside image included in the outside information is displayed on the display screen of the outer presentation unit 250 in this manner, an outside person can recognize a response of the user to the outside information by referring to the display screen of the outer presentation unit 250.

In addition, the presentation state control unit 245 may switch a presentation state based on inside information acquired by the inside information acquisition unit 143. Specifically, the presentation state control unit 245 may switch a presentation state based on, for example, line-of-sight information of the user included in inside information. When a pattern resembling the eyes of the user is displayed on the display screen of the outer presentation unit 250 as the information indicating that the user is viewing the outside image as described above, for example, the presentation state control unit 245 may change the display of the pattern resembling the eyes to indicate a state of the eyes of the user based on the line-of-sight information. For example, with respect to a state of the eyelids of the user, the display of the pattern resembling the eyes on the display screen of the outer presentation unit 250 may be changed so that the eyelids move up and down (as if the eyes were opening and closing). In addition, for example, the display of the pattern resembling the eyes on the display screen of the outer presentation unit 250 may change corresponding to a change in the line of sight of the user. When the display of the pattern resembling the eyes on the display screen of the outer presentation unit 250 changes corresponding to a change in the line of sight of the user, if the user moves the line of his or her sight toward a person included in an outside image displayed on the display screen of the inner notification unit 130, the pattern resembling the eyes on the display screen of the outer presentation unit 250 may also be displayed to move the line of sight toward the person. By displaying the trace of the line of sight of the user on the display screen of the outer presentation unit 250, a person who is attempting to communicate with the user from outside can recognize whether or not the line of sight of the user is directed toward him or her, and thus can recognize whether or not the user is paying attention to him or her.

It should be noted that the presentation state control unit 245 may switch a presentation state according to another type of information included in the inside information, for example, user information or content information other than line-of-sight information. For example, the presentation state control unit 245 may switch a presentation state according to whether the user at home or at work based on position information of the user. When the user is at home, for example, an outside person who is attempting to communicate with the user is assumed to be a family member or a friend, but when the user is at work, an outside person who is attempting to communicate with the user is assumed to be a boss, a customer, or the like with whom the user has a business relation. Thus, when user response information indicating the same meaning to the outside is presented at home, the presentation state control unit 245 may perform display so that the outside person is perceived as relatively familiar.

In addition, the presentation state control unit 245 may switch a presentation state based on a degree of awareness determined by the awareness degree determination unit 244. For example, when the pattern resembling the eyes of the user is displayed on the display screen of the outer presentation unit 250 as the information indicating that the user is viewing the outside image as described above, the presentation state control unit 245 may change the display of the pattern resembling the eyes based on a degree of awareness. As described above, "a state in which the user has recognized that the outside image has been displayed but not recognized the content of the outside image" can be expressed in addition to the alternative states of the user "viewing (aware of)" and "not viewing (unaware of)" the outside image included in the outside information according to degrees of awareness. When a degree of awareness is relatively high, for example, the pattern resembling the eyes may be explicitly displayed on the display screen of the outer presentation unit 250 to indicate that the user has clearly recognized the outside information. On the other hand, when a degree of awareness is relatively low, nothing may be displayed on the display screen of the outer presentation unit 250 to indicate that the user has not recognized the outside information. In addition, when a degree of awareness is intermediate (in the "state in which the user has recognized that the outside image has been displayed but not recognized the content of the outside image" described above), for example, display indicating an intermediate state of the degree of awareness, such as blurry display of the pattern resembling the eyes or display of a pattern of closed eyes, may be performed on the display screen of the outer presentation unit 250. By performing display reflecting the degree of awareness of the user on the display screen of the outer presentation unit 250, a person who is attempting to communicate with the user from outside can ascertain whether the user has recognized him or her.

It should be noted that specific examples of presentation state control by the presentation state control unit 245 will be described in detail in [2-3. Specific example of presentation state] below. In addition, specific examples of a connection between notification state control by the notification state control unit 142 and presentation state control by the presentation state control unit 245 will be described in detail in [2-4. Specific example of notification state and presentation state] below.

The example of the configuration of the non-see-through HMD device 20 according to the second embodiment of the present disclosure has been described above in detail with reference to FIG. 9. Each constituent element described above may be configured using a versatile member or circuit, and may be configured as hardware specified in the function of the constituent element. In addition, for the control unit 240, a CPU may perform all functions of respective constituent elements. Thus, a configuration to be used can be appropriately changed according to the technical level of each time the present embodiment is implemented. It should be noted that a hardware configuration of the non-see-through HMD device 20 will be described in <3. Hardware configuration> below in detail.

As described with reference to FIG. 9 above, the presentation state control unit 245 switches a presentation state in which information indicating a response of the user to outside information is presented to the outside of the user based on a notification state of the outside information with respect to the user switched by the notification state control unit 142 in the second embodiment. Thus, the following effect can be obtained in the second embodiment in addition to the effect obtained in the first embodiment. That is to say, since a response of the user to the outside information is presented to an outside person in the second embodiment, the outside person can recognize a state of the user in which the user is paying attention to outside information (for example, the person is attempting to communicate with the user), and can react appropriately according to the state of the user. Therefore, smoother communication between the user and the outside person is realized.

In addition, the awareness degree determination unit 244 determines a degree of awareness of the user with respect to outside information based on at least any of a notification state of the outside information with respect to the user switched by the notification state control unit 142 and inside information acquired by the inside information acquisition unit 143 in the second embodiment. Then, the presentation state control unit 245 may switch a presentation state in which the information indicating a response of the user to the outside information is presented to the outside of the user based on at least any of the inside information and a degree of awareness. By reflecting information indicating a state of the user, for example, line-of-sight information or a degree of awareness of the user with respect to the outside information in the presentation state as described above, the outside person can recognize not only whether or not the user is paying attention to the outside information but also a more detailed state of the user, such as the line of sight of the user or a degree to which the user is paying attention to the outside information, and therefore communication between the user and the outside person can be smoother.

It should be noted that, in notification state control by the presentation state control unit 245 using the outer presentation unit 250, a notification state of the outer presentation unit 250 may be controlled based on a notification state, a degree of awareness and/or inside information, and may be appropriately switched with an operation input by the user. That is to say, by appropriately inputting a command from the user to the presentation state control unit 245, display on the display screen of the outer presentation unit 250 and an output from the audio output device may be changed. It should be noted that the operation input by the user to switch presentation state control may be performed, for example, with a button or a switch, or by performing a predetermined gesture toward the camera of the outside information detection unit 110 shown in FIG. 9.

It should be noted that, although the case in which the presentation state control unit 245 switches a presentation state of user response information to the outside by displaying the pattern resembling the eyes of the user on the display screen of the outer presentation unit 250 has been described above, the present embodiment is not limited thereto. For example, the presentation state control unit 245 may display a direct message using text, a symbol, or the like or a pattern of an object other than the eyes on the display screen of the outer presentation unit 250. In addition, when the display unit of the outer presentation unit 250 has a lamp or the like rather than a display screen, a presentation state of user response information to the outside may be switched by controlling driving of the lamp.

In addition, although the case in which the presentation state control unit 245 switches a presentation state of user response information to the outside by controlling display of the display screen of the outer presentation unit 250 has been described, the present embodiment is not limited thereto. For example, the presentation state control unit 245 may switch the presentation state with respect to the outside by controlling an output of the audio output device of the outer presentation unit 250. For example, a sound indicating a response of the user to the outside information may be output from the audio output device of the outer presentation unit 250 based on a notification state, a degree of awareness, and/or inside information. The sound may be the voice of a person (for example, the user) or the sound of a buzzer, an alarm, or the like. An outside person can hear the sound output from the audio output device of the outer presentation unit 250 and recognize a state of the user.

In addition, although the non-see-through HMD device 20 includes the outside information detection unit 110, the inside information detection unit 120, the inner notification unit 130, the outer presentation unit 250, and the control unit 240 in the example illustrated in FIG. 9, the present embodiment is not limited thereto. For example, the non-see-through HMD device 20 may further have configurations of an input unit for the user to input various types of information, a storage unit for storing various types of information processed in the non-see-through HMD device 20, a communication unit for transmitting and receiving various types of information with other external devices, and the like. In addition, the non-see-through HMD device 20 may not be configured as one device, and respective functions that the non-see-through HMD device 20 has may be arbitrarily distributed to a plurality of devices. For example, only the outside information detection unit 110, the inside information detection unit 120, the inner notification unit 130, and the outer presentation unit 250 may be mounted in a device that is worn by the user, the control unit 240 may be mounted in another device, for example, an arbitrary information processing apparatus such as a smartphone that the user has, a tablet PC, or a server installed in another place, and the device worn by the user and the information processing apparatus in which the control unit 240 is mounted may exchange various types of information with each other through an arbitrary communication line (network), and thereby various processes of the non-see-through HMD device 20 described above can be performed.

[2-3. Specific Example of Presentation State]

Next, specific examples of presentation state control by the presentation state control unit 245 will be described in detail with reference to FIGS. 10A, 10B, 11, 12A, and 12B. In the following description regarding the specific examples of presentation state control, a case in which the presentation state control unit 245 switches a presentation state by controlling display of the display screen of the outer presentation unit 250 will be exemplified, in addition, in FIGS. 10A, 10B, 11, 12A, and 12B, states of a person 600 wearing the non-see-through HMD device 20 of the second embodiment when viewed from the front are illustrated.

Figure 10A:
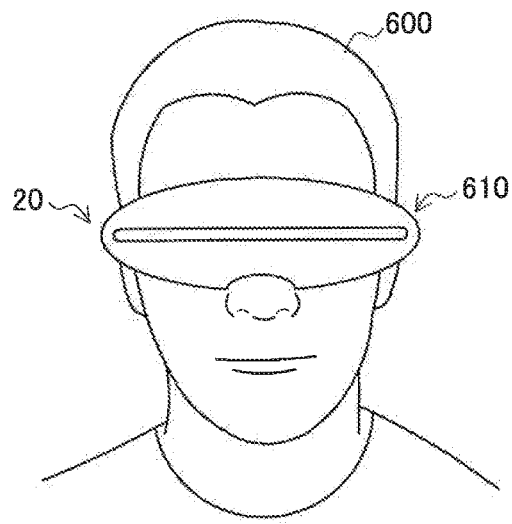
FIG. 10A is an illustrative diagram for describing a specific example in which a display screen of an outer presentation unit is controlled by a presentation state control unit when a user has not been notified of outside information.
Figure 10B:
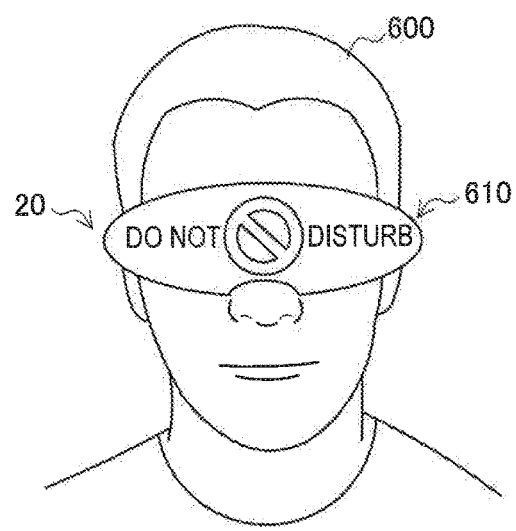
FIG. 10B is an illustrative diagram for describing a specific example in which a display screen of an outer presentation unit is controlled by a presentation state control unit when a user has not been notified of outside information.

First, control of the display screen of the outer presentation unit 250 by the presentation state control unit 245 in a state in which the user has not been notified of outside information will be described with reference to FIGS. 10A and 10B. FIGS. 10A and 10B are illustrative diagrams for describing a specific example of control of the display screen of the outer presentation unit 250 by the presentation state control unit 245 in the state in which the user has not been notified of the outside information. It should be noted that the state in which the user has not been notified of the outside information corresponds to, for example, the case in which the necessity degree determination unit 141 shown in FIGS. 2 and 9 determines a degree of necessity that the user be notified of outside information to be low.

Referring to FIG. 10A, a line of the lateral direction is displayed on a display screen 610 facing the outside of the non-see-through HMD device 20. The display screen 610 corresponds to the display screen of the outer presentation unit 250 illustrated in FIG. 9. When the user has not been notified of the outside information even though the outside information has been detected, the indication that the user has not been notified of the outside information may be presented to the outside by displaying the line in the lateral direction on the display screen 610. For example, when the outside information is information indicating that an outside person has approached the user, the outside person who has approached can recognize that the user is not yet paying attention to him or her, and thus can notify the user of outside information indicating that he or she wants to communicate with the user by reacting in another way, for example, making a specific gesture to the user.

In addition, referring to FIG. 10B, text of "DO NOT DISTURB" and a symbol indicating prohibition are displayed on the display screen 610 facing the outside of the non-see-through HMD device 20. When the user has not been notified of the outside information even though the outside information has been detected as described above, information indicating that the user wants to concentrate on work may be displayed on the display screen 610 according to a setting made by the user. When the outside information is information indicating that the outside person has approached the user, the outside person who has approached can recognize that the user is not yet paying attention to him or her and the user wants to concentrate the work, and thus can react appropriately according to the situation, such as trying to contact the user another time if his or her business is not urgent.

As described above with reference to FIGS. 10A and 10B, in the state in which the user has not been notified of the outside information, display indicating that the user is not paying attention to the outside information, such as the line in the lateral direction illustrated in FIG. 10A, may be shown on the display screen 610 to the outside. Further, information indicating that the user wants to concentrate on work as illustrated in FIG. 10B may be displayed on the display screen 610 according to a setting made by the user.

Figure 11:
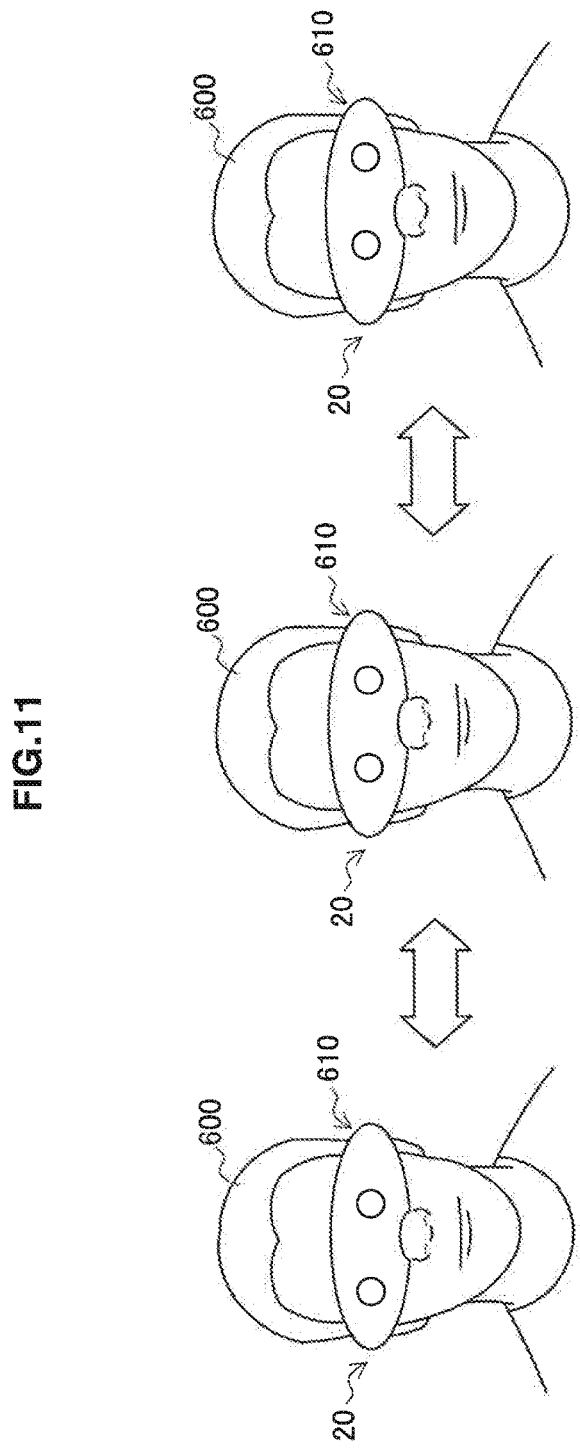
FIG. 11 is an illustrative diagram for describing a specific example in which the display screen of the outer presentation unit is controlled by the presentation state control unit based on line-of-sight information of the user.

Next, control of the display screen of the outer presentation unit 250 by the presentation state control unit 245 based on line-of-sight information of the user will be described with reference to FIG. 11. FIG. 11 is an illustrative diagram for describing a specific example of control of the display screen of the outer presentation unit 250 by the presentation state control unit 245 based on line-of-sight information of the user. In FIG. 11, the user has been notified of outside information and a case in which a pattern resembling the eyes of the user is being displayed on the display screen of the outer presentation unit 250 shown in FIG. 9 is illustrated as an example of display indicating the user's state.

Referring to FIG. 11, the pattern resembling the eyes of the user is displayed on the display screen 610 facing the outside of the non-see-through HMD device 20. In addition, the display on the display screen 610 changes as the pattern resembling the eyes moves according to the line of sight of the user as illustrated in FIG. 11. This corresponds to control of display of the pattern resembling the eyes by the presentation state control unit 245 on the display screen of the outer presentation unit 250 according to a change of the line of sight of the user based on the line-of-sight information of the user included in inside information as described with reference to FIG. 9. In this manner, in the state in which the user has been notified of the outside information, the pattern resembling the eyes displayed on the display screen 610 may be displayed to move according to the line of sight of the user. Thus, an outside person who has visually recognized the display screen 610 can recognize whether or not the user is paying attention to his or her approach and whether or not the user is viewing him or her, and thus can communicate with the user more smoothly.

Figure 12A:
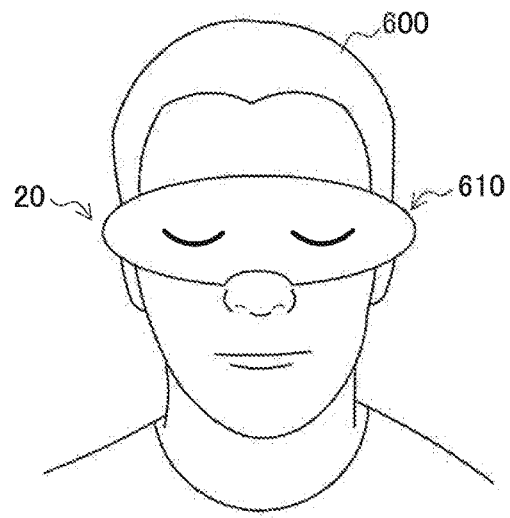
FIG. 12A is an illustrative diagram for describing another specific example in which the display screen of the outer presentation unit is controlled by the presentation state control unit based on line-of-sight information of the user.
Figure 12B:
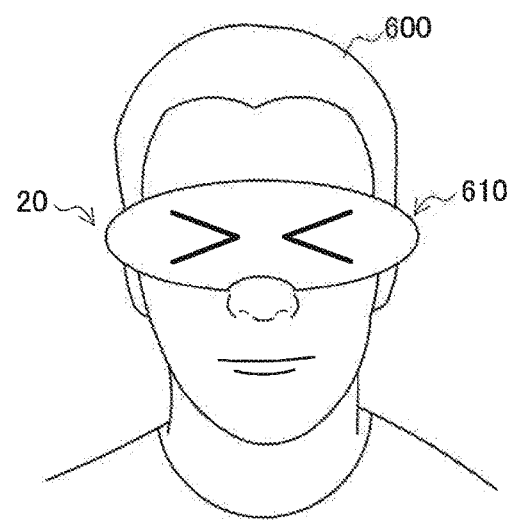
FIG. 12B is an illustrative diagram for describing another specific example in which the display screen of the outer presentation unit is controlled by the presentation state control unit based on line-of-sight information of the user.

In addition, in FIGS. 12A and 12B, another specific example of control of the display screen of the outer presentation unit 250 by the presentation state control unit 245 based on the line-of-sight of the user is illustrated. FIGS. 12A and 12B are illustrative diagrams for describing a specific example of control of the display screen of the outer presentation unit 250 by the presentation state control unit 245 based on the line-of-sight of the user. Referring to FIG. 12A, a pattern resembling the eyes of the user is displayed on the display screen 610 facing the outside of the non-see-through HMD device 20; however; the displayed pattern indicates that the eyes are closed. In addition, referring to FIG. 12B, a pattern resembling the eyes of the user is displayed on the display screen 610 likewise; however, the displayed pattern indicates blinking. In this manner, all types of information indicating states of the eyes such as not only the line of sight of the user, but also states of the eyelids, opening and closing of the eyes of the user, and the like may be displayed on the display screen 610. When the user is weeping, for example, information indicating that the user is crying may be displayed on the display screen 610. Thus, an outside person can recognize a more detailed state of the user, and thus can communicate with the user more smoothly.

As described above with reference to FIGS. 11, 12A, and 12B, various types of information indicating states of the eyes of the user may be displayed on the display screen 610 with respect to the outside. Here, in face-to-face interpersonal communication, the importance of information obtained from a state of the eyes has been appreciated in addition to information obtained from words. It is said that, for example, when a conversation is performed in a state in which the eyes of a partner are blocked, it is difficult to understand the thoughts and intentions of the partner. Thus, by displaying information indicating a state of the eyes of the user on the display screen 610 facing the outside of the non-see-through HMD device 20 as in the present embodiment, it is easier for an outside person to understand the thoughts and intentions of the user.

[2-4. Specific Example of Notification State and Presentation State]

Next, specific examples of a connection between notification state control by the notification state control unit 142 and presentation state control by the presentation state control unit 245 shown in FIG. 9 will be described with reference to FIGS. 13 and 14. FIGS. 13 and 14 are illustrative diagrams for describing specific examples of the connection between notification state control by the notification state control unit 142 and presentation state control by the presentation state control unit 245. In FIGS. 13 and 14, a state in which the display screen of the inner notification unit 130 shown in FIG. 9 changes in order is illustrated on the left side of the drawing, and a state in which the display screen of the outer presentation unit 250 changes in order corresponding to the change of the display screen of the inner notification unit 130 is illustrated on the right side of the drawing. In addition, as a specific example, FIG. 13 illustrates the case illustrated in FIG. 4A, i.e., the case in which the display of the display screen 510 and output from the audio output device of the inner notification unit 130 are switched from the content image 520 and the content sound to the outside image 530 and an outside sound. In addition, as a specific example, FIG. 14 illustrates the case illustrated in FIG. 41), i.e., the case in which the outside image 530 is superimposed and displayed in the partial area of the display of the content image 520 on the display screen 510 of the inner notification unit 130 and the outside sound is superimposed on the content sound and output from the audio output device.

Referring to FIG. 13, the content image is displayed on the display screen 510 of the inner notification unit 130 and the content sound is output from the audio output device of the inner notification unit 130 in the first part. That is to say, the state of the first part is the state in which the user has been notified of the content information and is working. Since the outside information has not been detected and the user has not been notified of the information in the state of the first part, nothing is displayed on the display screen 610 of the outer presentation unit 250.

The second part of FIG. 13 illustrates a transition state in which the outside information (for example, information indicating that an outside person has approached the user) has been detected and the display of the display screen 510 and output from the audio output device of the inner notification unit 130 are switched from the content image 520 and the content sound to the outside image 530 and the outside sound. When the display of the display screen 510 of the inner notification unit 130 is switched in this manner, a state in which nothing is displayed on the display screen 510 may be set for a predetermined time in order to indicate the transition of the display of the display screen 510 to the user. When the display of the display screen 510 is switched to the state in which nothing is displayed, the user can recognize that any outside information has been detected. In addition, the state of the second part is a "state in which the user has recognized that the outside information has been detected but not recognized the content of the outside information" for the user. Thus, information indicating the user's state may be displayed on the display screen 610 of the outer presentation unit 250. Since the example illustrated in FIG. 13 indicates that the user is in the "state in which the user has recognized that the outside information has been detected but not recognized the content of the outside information," a pattern of closed eyes as illustrated in FIG. 12A is displayed. By switching the display of the display screen 610 as described above, the outside person who has approached the user can recognize that the user has not yet recognized the content of the outside information. However, display of the display screen 610 for indicating that the user is in the "state in which the user has recognized that the outside information has been detected but not recognized the content of the outside information" is not limited to the example illustrated in the second part of FIG. 13, and another pattern may be displayed as long as this state can be presented to the outside person.

The third part of FIG. 13 illustrates the state immediately after the display of the display screen 510 and the output from the audio output device of the inner notification unit 130 are switched to the outside image 530 and the outside sound. By displaying the outside image 530 on the display screen 510 in this manner, the user can recognize the outside situation. In addition, in order to indicate that the user is viewing the outside image 530 the pattern resembling the eyes of the user is displayed on the display screen 610 of the outer presentation unit 250. However, since the state of the third part is the state immediately after the display of the display screen 510 is switched to the outside image 530, the user is viewing the entire outside image 530 but not directing his or her line of sight toward the person included in the outside image 530. Thus, the pattern resembling the eyes displayed on the display screen 610 is displayed so that the line of sight of the user faces forward. By switching the display of the display screen 610 in this manner, the outside person can recognize that the user is viewing the outside image and the user has not looked in his or her direction based on a display position of the pattern resembling the eyes.

The fourth part of FIG. 13 illustrates that the display of the display screen 510 and the output from the audio output device of the inner notification unit 130 have been switched to the outside image 530 and the outside sound and the user has recognized that the outside person has approached. That is to say, the user has recognized the approach of the outside person by visually recognizing the outside image 530 displayed on the display screen 510 and moved his or her line of sight toward the person of the outside image 530. The pattern resembling the eyes of the user is displayed on the display screen 610 of the outer presentation unit 250 to indicate that the user is viewing the outside image 530, and the pattern resembling the eyes is displayed in the direction from which the outside person approached (the right direction from the viewpoint of the user in the example of FIG. 13) to indicate the line of sight of the user. By switching the display of the display screen 610 in this manner, the outside person who approached the user can recognize that the user is looking in his or her direction.

Next, another specific example of the connection between notification state control by the notification state control unit 142 and presentation state control by the presentation state control unit 245 shown in FIG. 9 will be described with reference to FIG. 14.

Referring to FIG. 14, the state illustrated in the first part is the same as the state illustrated in the first part of FIG. 13. In other words, the state of the first part is the state in which the user has been notified of the content information and nothing is displayed on the display screen 610 of the outer presentation unit 250.

The second part of FIG. 14 illustrates a state in which outside information (for example, information indicating that an outside person has approached) is detected, the outside image 530 is superimposed on a partial area of the display of the content image 520 and displayed on the display screen 510 of the inner notification unit 130, and the outside sound is superimposed on the content sound and output from the audio output device. Since the state illustrated in the second part is the state immediately after the user is notified of the outside information, it is the "state in which the user has recognized that the outside information has been detected but not recognized the content of the outside information" for the user. Thus, information indicating the state may be displayed on the display screen 610 of the outer presentation unit 250. In order to indicate that the user is in the "state in which the user has recognized that the outside information has been detected but not recognized the content of the outside information" in the example illustrated in FIG. 14, the pattern of the closed eyes is displayed as illustrated in FIG. 12A as in FIG. 13. The display of the display screen 610 of the outer presentation unit 250 may be controlled by the presentation state control unit 245 shown in FIG. 9, for example, to be displayed for a predetermined time after the outside information is displayed on the display screen 510 of the inner notification unit 130. The reason for such control is that, when both the content image 520 and the outside image 530 are displayed on the display screen 510 of the inner notification unit 130 as illustrated in FIG. 14, the user is continuing his or her work while referring to the content image at the moment at which the outside image is displayed on the display screen 510 of the inner notification unit 130, and thus it is not possible to visually recognize the outside image 530 promptly, and a predetermined period of time is required to recognize the content of the outside image 530. By switching the display of the display screen 610 as illustrated in the second part of FIG. 14, the outside person who has approached the user can recognize that the user has not yet recognized the content of the outside information. However, display of the display screen 610 for indicating that the user is in the "state in which the user has recognized that the outside information has been detected but not recognized the content of the outside information" is not limited to the example illustrated in the second part of FIG. 14, and another pattern may be displayed as long as the state can be presented to an outside person.

The third part of FIG. 14 illustrates a state in which a predetermined period of time has elapsed after the outside image 530 was superimposed on the partial area of the content image 520 and displayed on the display screen 510 of the inner notification unit 130 and the outside sound was superimposed on the content sound and output from the audio output device. Since the predetermined period of time has elapsed after the outside information was displayed on the display screen 510 of the inner notification unit 130, the user has recognized the outside situation. Thus, the pattern resembling the eyes of the user is displayed on the display screen 610 of the outer presentation unit 250 in order to indicate that the user is viewing the outside image 530. However, in the state illustrated in the third part, the line of sight of the user is not directed toward the person included in the outside image 530 while the display of the display screen 510 has been switched to the outside image 530. Thus, the pattern resembling the eyes displayed on the display screen 610 is displayed as if the line of sight of the user were facing forward. By switching the display of the display screen 610 in this manner, the outside person who has approached the user can recognize that the user is viewing the outside image and that the user is not looking in his or her direction based on the display position of the pattern resembling the eyes.

The fourth part of FIG. 14 is the same state as the state illustrated in the fourth part of FIG. 13, and illustrates that the display of the display screen 510 and the output from the audio output device of the inner notification unit 130 have been switched to the outside image 530 and the outside sound. The user has recognized the approach of the outside person by visually recognizing the outside image 530 displayed on the display screen 510 and moved his or her line of sight toward the person of the outside image 530. At this time, the pattern resembling the eyes of the user is displayed on the display screen 610 of the outer presentation unit 250 to indicate that the user is viewing the outside image 530, and the pattern resembling the eyes is displayed in the direction from which the outside person approached (the right direction from the viewpoint of the user in the example of FIG. 14) to indicate the line of sight of the user. By switching the display of the display screen 610 in this manner, the outside person who approached the user can recognize that the user is looking in his or her direction.

The specific example of the connection between the notification state control by the notification state control unit 142 and the presentation state control by the presentation state control unit 245 shown in FIG. 9 has been described above with reference to FIGS. 13 and 14. As described above, in the non-see-through HMD device 20 according to the second embodiment, the information indicating a response of the user to the outside information is displayed on the display screen 610 of the outer presentation unit 250 in association with the display of the display screen 510 of the inner notification unit 130. In addition, the notification state of the inner notification unit 130, the degree of awareness of the user with respect to the outside information, and/or inside information are reflected in the information displayed on the display screen 610. Thus, the outside person who is attempting to communicate with the user can recognize a specific response of the user to the outside information, such as whether or not the user has recognized that he or she has approached, and if so, whether or not the user is looking in his or her direction. Thus, the outside person can react appropriately; for example, by starting to talk after waiting until the user's line of sight is directed toward him or her, or the like, to communicate with the user.

It should be noted that the display of the display screen 510 and the display of the display screen 610 illustrated in FIGS. 13 and 14 need not change in the order illustrated in the drawings, or according to elapse of a predetermined period of time. The display of the display screen 510 and the display of the display screen 610 may be appropriately switched with an operation input by the user. For example, in the example illustrated in FIG. 14, after the user is notified of the outside information in the state illustrated in the third part, the display of the display screen 510 and the display of the display screen 610 may transition to the state illustrated in the fourth part with an operation input by the user when the user wants to concentrate on communication with the outside person, and may not change with the state illustrated in the third part being maintained when the user wants to communicate with the outside person while continuing the work.

In addition, a connection between notification state control by the notification state control unit 142 and presentation state control by the presentation state control unit 245 is not limited to the example illustrated in FIGS. 13 and 14 in the second embodiment. Whether or not the user has been notified of the outside information, and if so, a response of the user to the outside information may be presented to the outside according to a notification state, a degree of awareness of the user, and the like, and a presentation state may be any state in the form of a mark, text, a symbol, a sound, and the like. In addition, what type of information is to be presented in which case may be appropriately set by the user. That is to say, a type of user response information to be presented to the outside and a presentation state thereof regarding a specific notification state, degree of awareness, and inside information may be appropriately set by the user. Since the user can perform detailed settings according to a situation in presentation state control in this manner, it is possible for the outside person to understand the thoughts and intentions of the user more smoothly.

It should be noted that the "state in which the user has recognized that the outside information has been detected but not recognized the content of the outside information" illustrated in the second parts of FIGS. 13 and 14 is, for example, a transitioned state from the content information when the user is notified of the outside information as described above, a state immediately after the user is notified of the outside information, a state in which the user is notified of the outside information in stages as illustrated in FIG. 5, a state in which the user is notified of the information indicating that the outside information has been detected as illustrated in FIGS. 6A to 6C, or the like.

[2-5. Processing Procedure of Presentation State Control Method]

Next, the processing procedure of the presentation state control method according to the second embodiment of the present disclosure will be described with reference to FIG. 15. FIG. 15 is a flow chart showing the processing procedure of the presentation state control method according to the second embodiment of the present disclosure. It should be noted that, in the following description regarding the processing procedure of the presentation state control method, since the functions and configurations of the outside information detection unit 110, the inside information detection unit 120, the inner notification unit 130, the outer presentation unit 250, and the control unit 240 have been described with reference to FIG. 9, detailed description thereof will be omitted. In addition, since processes of Steps S801 to S809 of FIG. 15 are the same as those of Steps S701 to S709 of the processing procedure of the notification state control method according to the first embodiment shown in FIG. 7, detailed description of the processes of Steps S801 to S809 will be omitted in the following description regarding the processing procedure of the presentation state control method.

Referring to FIG. 15, the same processes as those of Steps S701 to S709 of the processing procedure of the notification state control method according to the first embodiment shown in FIG. 7 are performed in Steps S801 to S809 as described above. That is to say, in Step S809, the notification state control unit 142 controls a notification state of outside information with respect to the user of the inner notification unit 130 based on a degree of necessity determined by the necessity degree determination unit 141. However, the acquisition process of inside information in Step S805 may be omitted when the inside information is not used in the determination process of the degree of necessity by the necessity degree determination unit 141 in Step S807, the determination process of a degree of awareness by the awareness degree determination unit 244 in Step S811 to be described below and/or the control process of a presentation state by the presentation state control unit 245 in Step S813 to be described below. When the notification state of the outside information has been controlled in Step S809, the process proceeds to Step S811.

In Step S811, the degree of awareness of the user with respect to the outside information is determined by the awareness degree determination unit 244 based on at least any of the notification state switched by the notification state control unit 142 and the inside information acquired by the inside information acquisition unit 143. As described in [2-2. Configuration of presentation state control device] above, the degree of awareness of the user may be determined here according to several grades or scores based on the notification state of the outside information in the inner notification unit 130, information such as line-of-sight information included in biological information, and the like. It should be noted that, when the degree of awareness is not used in the control process of the presentation state by the presentation state control unit 245 in Step S813 to be described below, the process of Step S811 may be omitted.

Next, in Step S813, the presentation state control unit 245 switches the presentation state in which information indicating a response of the user to the outside information is presented to the outside of the user based on the notification state switched by the notification state control unit 142. In addition, the switching of the presentation state by the presentation state control unit 245 may be performed based on the inside information acquired in Step S805 and/or the degree of awareness determined in Step S811. In addition, the switching of the presentation state by the presentation state control unit 245 may be performed such that various marks, text, or the like indicating the response of the user to the outside information are displayed on the display screen facing the outside, as described in, for example, [2-3. Specific example of presentation state] and [2-4. Specific example of notification state and presentation state] above.

Finally, in Step S815, the outside person interacts with the user in any of various ways based on the presentation state controlled in Step S813. Specifically, when information indicating that the user has recognized the outside information and the outside person (for example, information indicating that the user is directing his or her line of sight toward the outside person) is presented, for example, the outside person can communicate with the user by starting to talk to the user. In addition, when information indicating that the user has not recognized the outside information is presented, for example, the outside person can communicate with the user, such as by starting to talk to the user, after performing an action such as waving his or her hand to the user such that his or her presence is recognized. In this manner, the outside person can select a proper reaction according to a situation based on the presentation state controlled in Step S813.

The processing procedure of the presentation state control method according to the second embodiment of the present disclosure has been described with reference to FIG. 15.

3. Hardware Configuration

Next, a hardware configuration of the non-see-through HMD devices 10 and 20 according to the first and second embodiments of the present disclosure will be described in detail with reference to FIG. 16. FIG. 16 is a block diagram for describing the hardware configuration of the non-see-through HMD devices 10 and 20 according to the first and second embodiments of the present disclosure.

The non-see-through HMD devices 10 and 20 each mainly have a CPU 901, a ROM 903, and a RAM 905. In addition, the non-see-through HMD devices 10 and 20 each have a host bus 907, a bridge 909, an external bus 911, an interface 913, a sensor device 914, an input device 915, an output device 917, a storage device 919, a drive 921, a connection port 923, and a communication device 925.

The CPU 901 functions as an arithmetic processing device and a control device, and controls a part or all of operations performed in the non-see-through HMD devices 10 and 20 according to various programs recorded in the ROM 903, the RAM 905, the storage device 919, and a removable recording medium 927. The ROM 903 stores programs, arithmetic parameters, and the like used by the CPU 901. The RAM 905 primarily stores programs used by the CPU 901, parameters that appropriately change in execution of the programs, and the like. The constituent elements are connected to one another by the host bus 907 configured as an internal bus such as a CPU bus. The CPU 901 corresponds to, for example, the control units 140 and 240 shown in FIGS. 2 and 9 in the first and second embodiments.

The host bus 907 is connected to the external bus 911 such as a peripheral component interconnect/interface (PCI) bus via the bridge 909. In addition, the sensor device 914, the input device 915, the output device 917, the storage device 919, the drive 921, the connection port 923, and the communication device 925 are connected to the external bus 911 via the interface 913.

The sensor device 914 is a detection means such as a sensor which detects motions of a user, a sensor which acquires information indicating a current position, a sensor which detects biological information of a user, or the like. As examples of such a sensor, a motion sensor such as a tri-axial acceleration sensor including an acceleration sensor, a gravity detection sensor, or a fall-detection sensor, or a tri-axial gyro sensor such as an angular velocity sensor, a hand-shake correction sensor, or a geomagnetic sensor, a GPS sensor, a pulse sensor, a heartbeat sensor, and the like can be exemplified. In addition, the sensor device 914 may have various measurement devices such as a thermometer, an illuminometer, a hygrometer, a barometer, and the like. The sensor device 914 corresponds to, for example, the inside information detection unit 120 shown in FIGS. 2 and 9 in the first and second embodiments. More specifically, the sensor device 914 includes, for example, the line-of-sight sensor units 314a and 314b illustrated in FIGS. 1A and 1B, and 8A and 8B.

The input device 915 is an operation means, for example, a mouse, a keyboard, a touch panel, a button, a switch, a lever, and the like operated by the user. In addition, the input device 915 may be, for example, a remote controlling means (i.e., remote controller) that uses infrared light or other radio waves, or may be an externally connected device 929 such as a mobile telephone, or a PDA, which corresponds to operations of the non-see-through HMD devices 10 and 20. Further, the input device 915 is configured with, for example, an input control circuit which generates an input signal based on information input by the user using the operation means and outputs the signal to the CPU 901, and the like. The user of the non-see-through HMD devices 10 and 20 can input various kinds of data to the non-see-through HMD devices 10 and 20 or instruct the devices to perform process operations by operating the input device 915. In the first and second embodiments, with an operation input by the user using the input device 915, for example, the notification state control unit 142 and the presentation state control unit 245 shown in FIGS. 2 and 9 may control display and audio output of the inner notification unit 130 and the outer presentation unit 250.

The output device 917 is configured to be a device which can visually or auditorily notify the user of acquired information. Such devices include display devices such as a CRT display device, a liquid crystal display (LCD) device, a plasma display device, an organic electro-luminescence display (OELD) device, an inorganic electro-luminescence display (IELD) device, and a lamp (for example, a light emitting diode (LED)), an audio output device such as a speaker, earphones, and headphones, a printing device, a mobile telephone, a facsimile, and the like. The output device 917 outputs, for example, results obtained through various processes performed by the non-see-through HMD devices 10 and 20. Specifically, the display device displays such results obtained through various processes performed by the non-see-through HMD devices 10 and 20 in various forms of text, an image, and the like. The display device corresponds to, for example, the configuration of the display unit of the inner notification unit 130 and the outer presentation unit 250 shown in FIGS. 2 and 9 in the first and second embodiments. More specifically, the display device corresponds to, for example, the inner display units 313a and 313b and the outer display unit 315 illustrated in FIGS. 1A, 1B, 8A, and 8B. In addition, the audio output device converts an audio signal composed of reproduced sound data, acoustic data, and the like into an analog signal and outputs the signal. The audio output device corresponds to, for example, the configuration of the audio output unit of the inner notification unit 130 and the outer presentation unit 250 shown in FIGS. 2 and 9 in the first and second embodiments. In addition, the output device 917 may be provided with an earphone jack to be connected with audio output devices such as earphones, headphones, and the like.

The storage device 919 is a device for data storage configured as an example of the storage unit of the non-see-through HMD devices 10 and 20. The storage device 919 is configured as, for example, a magnetic storage unit device such as a hard disk drive (HDD), a semiconductor storage device, an optical storage device, or a magneto-optical storage device. The storage device 919 stores programs and various kinds of data for execution of the CPU 901, various kinds of data acquired from the outside, and the like. The storage device 919 can store various types of information processed in the notification state control process and presentation state control process in the first and second embodiments.

The drive 921 is a reader-writer for recording media, and is installed in or externally attached to the non-see-through HMD devices 10 and 20. The drive 921 reads information recorded in the removable recording medium 927 such as a loaded magnetic disk, optical disc, or magneto-optical disc, or a semiconductor memory, and outputs the information to the RAM 905. In addition, the drive 921 can also write recording on the removable recording medium 927 such as a loaded magnetic disk, optical disc, or magneto-optical disc, or a semiconductor memory. The removable recording medium 927 is, for example, a DVD medium, an HD-DVD medium, a Blu-ray (registered trademark) medium, or the like. In addition, the removable recording medium 927 may be CompactFlash (CF) (registered trademark), a flash memory, a Secure Digital (SD) memory card, or the like. In addition, the removable recording medium 927 may be, for example, an integrated circuit (IC) card or an electronic device in which a non-contact IC chip is mounted. The drive 921 performs writing and reading of various types of information processed in the notification state control process and the presentation state control process in the first and second embodiments on and from various kinds of removable recording medium 927.

The connection port 923 is a port for directly connecting a device to the non-see-through HMD devices 10 and 20. As examples of the connection port 923, there are a Universal Serial Bus (USB) port, an IEEE 1394 port, a Small Computer System Interface (SCSI) port, and the like. As other examples of the connection port 923, there are an RS-232C port, an optical audio terminal, a High-Definition Multimedia Interface (HDMI; a registered trademark) port, and the like. By connecting the externally connected device 929 to the connection port 923, the non-see-through HMD devices 10 and 20 directly acquire various kinds of data from the externally connected device 929, and provide various kinds of data to the externally connected device 929. In the first and second embodiments, the non-see-through HMD devices 10 and 20 can exchange various types of information processed in the notification state control process and the presentation state control process with various kinds of externally connected device 929 via the connection port 923.

The communication device 925 is a communication interface configured as, for example, a communication device to be connected to a communication network (network) 931. The communication device 925 is a communication card for, for example, a wired or wireless local area network (LAN), Bluetooth (registered trademark), or a wireless USB (WUSB). In addition, the communication device 925 may be a router for optical communication, a router for asymmetric digital subscriber line (ADSL), a modem for various types of communication, or the like. In addition, for a communication scheme (standard) of the communication device 925, any communication scheme of, for example, a third generation (3G) mobile communication system, Long Term Evolution (LTE), Wireless Fidelity (Wi-Fi), Felica (registered trademark), near field communication (NFC), and the like can be applied. The communication device 925 can transmit and receive signals and the like on the Internet or with another communication device based on a predetermined protocol, for example, TCP/IP, or the like. In addition, the communication network 931 to which the communication device 925 is connected is configured as a network to be connected in a wired or wireless manner or the like, and may be, for example, the Internet, a home LAN, infrared communication, radio wave communication, satellite communication, or the like. In the first and second embodiments, the communication device 925 may cause the non-see-through HMD devices 10 and 20 and various external devices to exchange various types of information processed in the notification state control process and the presentation state control process with each other. For example, the communication device 925 may correspond to the outside information detection unit 110 shown in FIGS. 2 and 9, can exchange information with a device possessed by an outside person, and can receive device information of the device as outside information.

In addition, although not illustrated in FIG. 16, the non-see-through HMD devices 10 and 20 may have the following configuration. For example, the non-see-through HMD devices 10 and 20 may have an imaging device which acquires image signals indicating peripheral states as images, a sound recording device which acquires sound signals indicating peripheral states as sounds, and the like. The imaging device and the sound recording device correspond to, for example, the outside information detection unit 110 shown in FIGS. 2 and 9 of the first and second embodiments. More specifically, the imaging device and the sound recording device correspond to, for example, the camera 311 and the microphone 312 illustrated in FIGS. 1A and 1B, and 8A and 8B. In addition, the non-see-through HMD devices 10 and 20 may have a power source device (battery device) which supplies power to each of the constituent elements in the non-see-through HMD devices 10 and 20. For the power source device, any of various secondary batteries, for example, a lithium-ion secondary battery, or the like is applied.

The example of the hardware configuration that can realize the functions of the non-see-through HMD devices 10 and 20 according to the first and second embodiments has been introduced above. The constituent elements may be configured using versatile members, or with hardware specialized in the functions of the constituent elements. Thus, a hardware configuration to be used can be appropriately changed according to a technical level each time the embodiments are implemented.

It should be noted that a computer program for realizing the functions of the non-see-through HMD devices 10 and 20 according to the first and second embodiments as described above can be produced and installed in a personal computer or the like. In addition, a computer-readable recording medium in which such a computer program can be stored can also be provided. The recording medium is, for example, a magnetic disk, an optical disc, a magneto-optical disc, a flash memory, or the like. Further, the computer program may be distributed through, for example, a network, without using such a recording medium.

4. Conclusion

As described above, the following effect can be obtained in the first and second embodiments of the present disclosure.

In the first embodiment above, the necessity degree determination unit 141 determines a degree of necessity that a user be notified of outside information based on the outside information indicating a situation external to the user. In addition, the notification state control unit 142 switches a notification state of the outside information with respect to the user based on the determined degree of necessity. Since a degree of necessity that the user be notified of outside information is determined and the notification of the outside information is performed based on the determined degree of necessity in that way, the user can recognize that the outside information has been detected and react to the outside information appropriately, and thus can smoothly communicate with an outside person. For example, when a degree of necessity is high, the user is directly notified of outside information, and thus the user can directly recognize the outside information and quickly respond to an outside person attempting to communicate with the user. In addition, when a degree of necessity is intermediate or low, the user is notified of outside information in stages or notified of information indicating that the outside information has been detected, and thus the user can select an action according to a situation, such as prioritizing the work that the user is doing at that time or stopping the work and immediately responding to the outside person, and therefore user convenience is further enhanced.

In addition, the following effects can be obtained in the second embodiment, on top of the effect obtained in the first embodiment.

In the second embodiment, the presentation state control unit 245 switches a presentation state in which a response of the user to outside information is presented to the outside of the user based on a notification state of the outside information with respect to the user switched by the notification state control unit 142. Since the response of the user to the outside information is presented to the outside person in this manner, the outside person can recognize a state of the user such as whether or not the user is paying attention to the outside information (for example, his or her attempt to communicate with the user), and thus can react appropriately according to the state of the user. Thus, smoother communication between the user and the outside person is realized.

In addition, the awareness degree determination unit 244 determines a degree of awareness of the user with respect to outside information based on at least any of a notification state of the outside information with respect to the user switched by the notification state control unit 142 and inside information acquired by the inside information acquisition unit 143 in the second embodiment. Then, the presentation state control unit 245 may switch a presentation state in which the information indicating a response of the user to the outside information is presented to the outside of the user based on at least any of the inside information and a degree of awareness. By reflecting information indicating a state of the user, for example, line-of-sight information or a degree of awareness of the user with respect to the outside information in the presentation state as described above, the outside person can recognize not only whether or not the user is paying attention to the outside information but also a more detailed state of the user, such as the line of sight of the user or a degree to which the user is paying attention to the outside information, and therefore communication between the user and the outside person can be smoother.

In addition, in the second embodiment, the pattern resembling the eyes of the user, for example, is presented to the outside as a response of the user to the outside information based on line-of-sight information of the user. Further, information indicating that the user wants to continue his or her work is presented to the outside as a response of the user to the outside information. Thus, the outside person who is attempting to communicate with the user can understand the thoughts and feelings of the user, such as a desire to continue the work or to communicate.

If such non-see-through HMD devices become more widespread, work performed in information processing devices such as current PCs, smartphones, and the like with reference to display screens on desks or in hands can be considered to be performed by the non-see-through HMD devices worn by users. According to the first and second embodiments of the present disclosure, smoother communication between users wearing the non-see-through HMD devices 10 and 20 or between users wearing the non-see-through HMD devices 10 and 20 and outside persons is realized.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a necessity degree determination unit configured to determine, based on outside information indicating a situation external to a user, a degree of necessity that the user be notified of the outside information; and a notification state control unit configured to switch a notification state of the outside information with respect to the user based on the determined degree of necessity.

(2)

The information processing device according to (1), further including:

an inside information acquisition unit configured to acquire inside information that is information relating to the user, wherein the necessity degree determination unit determines the degree of necessity based on the inside information.

(3)

The information processing device according to (2), wherein the inside information includes user information indicating a state of the user, and wherein the necessity degree determination unit determines the degree of necessity based on the user information.

(4)

The information processing device according to (3), wherein the user information includes at least any of motion information indicating a motion of the user, position information of the user, biological information of the user, and information regarding an action schedule of the user.

(5)

The information processing device according to any one of (2) to (4), wherein the inside information includes content information that is information other than the outside information and is information of which the user has been notified, and wherein the necessity degree determination unit determines the degree of necessity based on the content information.

(6)

The information processing device according to (5), wherein the content information includes information regarding a scene of corresponding content of which the user has been notified.

(7)

The information processing device according to any one of (2) to (6), wherein the necessity degree determination unit determines, based on the inside information, a degree of immersion of the user with respect to content information that is information other than the outside information and is information of which the user has been notified, and determines the degree of necessity based further on the degree of immersion.

(8)

The information processing device according to any one of (1) to (7), wherein the notification state control unit switches a notification state of the outside information with respect to the user based on a result obtained by comparing the degree of necessity to a predetermined threshold value.

(9) The information processing device according to (8), wherein, when the degree of necessity is equal to or higher than a first threshold value or when the degree of necessity is higher than the first threshold value, the notification state control unit causes the user to be notified of the outside information.

(10) The information processing device according to (9),
wherein the outside information is image information and sound information indicating a situation external to the user, and
wherein, when the degree of necessity is equal to or higher than the first threshold value or when the degree of necessity is higher than the first threshold value, the notification state control unit superimposes the image information and the sound information on content information that is information other than the outside information and is information of which the user has been notified for notification.

(11) The information processing device according to (9),
wherein the outside information is image information and sound information indicating a situation external to the user, and
wherein, when the degree of necessity is equal to or higher than the first threshold value or when the degree of necessity is higher than the first threshold value, the notification state control unit switches content information that is information other than the outside information and is information of which the user has been notified into the image information and the sound information for notification.

(12) The information processing device according to any one of (9) to (11), wherein, when the outside information includes specific information, the degree of necessity is determined to be higher than the first threshold value by the necessity degree determination unit.

(13) The information processing device according to any one of (9) to (12), wherein, when the degree of necessity is lower than the first threshold value and equal to or higher than a second threshold value that is lower than the first threshold value, when the degree of necessity is equal to or lower than the first threshold value and equal to or higher than the second threshold value, when the degree of necessity is lower than the first threshold value and higher than the second threshold value, or when the degree of necessity is equal to or lower than the first threshold value and higher than the second threshold value, the notification state control unit causes the user to be notified of the outside information in stages.

(14) The information processing device according to (13),
wherein the outside information is image information and sound information indicating a situation external to the user, and
wherein, when the degree of necessity is lower than the first threshold value and equal to or higher than the second threshold value that is lower than the first threshold value, when the degree of necessity is equal to or lower than the first threshold value and equal to or higher than the second threshold value, when the degree of necessity is lower than the first threshold value and higher than the second threshold value, or when the degree of necessity is equal to or lower than the first threshold value and higher than the second threshold value, the notification state control unit superimposes the sound information on content information that is information other than the outside information and is information of which the user has been notified for notification, and then superimposes the image information on the content information for notification.

(15) The information processing device according to (13) or (14), wherein, when the degree of necessity is lower than the second threshold value or when the degree of necessity is equal to or lower than the second threshold value, the notification state control unit causes the user to be notified of predetermined information indicating that the outside information has been detected.

(16) The information processing device according to (15),
wherein the outside information is image information and sound information indicating a situation external to the user, and
wherein, when the degree of necessity is lower than the second threshold value or when the degree of necessity is equal to or lower than the second threshold value, the notification state control unit causes the user to be notified of predetermined information indicating that the image information or the sound information has been detected and causes the user to be notified of a direction in which the image information or the sound information has been detected while causing the user to be notified of content information that is information other than the outside information and is information of which the user has been notified.

(17) The information processing device according to any one of (1) to (16), wherein the outside information includes at least any of image information indicating a situation external to the user with an image, sound information indicating a situation external to the user with a sound, and device information relating to another device external to the user acquired through communication with the other device.

(18) The information processing device according to any one of (1) to (17), further including:
an inner display unit configured to have a display screen which displays an image indicating a situation external to the user included in the outside information or a predetermined image indicating that the outside information has been detected to the user and to block a field of view of the user with respect to the outside when the user wears the information processing device and the display screen is positioned in front of the eyes of the user,
wherein the outside information includes at least image information indicating a situation external to the user, and
wherein the notification state control unit switches a notification state of the outside information with respect to the user by switching display on the display screen of the inner display unit.

(19) A notification state control method including:
determining, based on outside information indicating a situation external to a user, a degree of necessity that the user be notified of the outside information; and
switching a notification state of the outside information with respect to the user based on the determined degree of necessity.

(20)

A program causing a computer to realize:

a function of determining, based on outside information indicating a situation external to a user, a degree of necessity that the user be notified of the outside information; and a function of switching a notification state of the outside information with respect to the user based on the determined degree of necessity.

REFERENCE SIGNS LIST 10, 20 non-see-through HMD device (information processing device)
110 outside information detection unit
120 inside information detection unit
130 inner notification unit
140, 240 control unit
141 necessity degree determination unit
142 notification state control unit
143 inside information acquisition unit
244 awareness degree determination unit
245 presentation state control unit
250 outer presentation unit
210, 310 main body part
311 camera
312 microphone
313a, 313b inner display unit
314a, 314b line-of-sight sensor unit
315 outer display unit
320 band part

The invention claimed is:

1. An information processing device comprising:
    circuitry configured to:
        control a display device to display a content image based on content information;
        determine, based on outside information indicating an external situation of a user, a degree of necessity that the user be notified of the outside information; and
        control, based on the determined degree of necessity, the display device to arrange a notification image corresponding to at least part of the external situation at a position of the content image, wherein the position of the content image corresponds to a position of the at least part of the external situation.

2. The information processing device according to claim 1,
    wherein the circuitry is further configured to:
        acquire user information that includes at least one of position information of the user, biological information of the user, and information regarding an action schedule of the user, and
    wherein the circuitry is further configured to determine the degree of necessity based on the user information.

3. The information processing device according to claim 2, wherein the circuitry is further configured to:
    determine, based on the user information, a degree of immersion of the user with respect to the content information; and
    determine the degree of necessity based on the degree of immersion.

4. The information processing device according to claim 2,
    wherein the user information includes the biological information, and
    wherein the biological information includes line-of-sight information on the content image.

5. The information processing device according to claim 1,
    wherein the circuitry is further configured to determine the degree of necessity based on a scene of the content information.

6. The information processing device according to claim 1,
    wherein the circuitry is further configured to control an audio device to output a content sound based on the content information, and
    wherein the circuitry is further configured to control, based on the determined degree of necessity, the audio device to superimpose the outside sound on the content sound.

7. The information processing device according to claim 6,
    wherein the circuitry is further configured to control, when the determined degree of necessity increases after the outside sound is superimposed, the display device to display the notification image.

8. The information processing device according to claim 1,
    wherein the position of the notification image indicates a direction of the outside information.

9. The information processing device according to claim 8,
    wherein the notification image includes a plurality of notification images, and
    wherein the circuitry is further configured to control the display device to arrange the plurality of notification images to indicate directions of a plurality of pieces of the outside information.

10. The information processing device according to claim 1, wherein the outside information includes at least one of image information indicating the external situation, sound information indicating the external situation, and device information relating to an external device to the information processing device, the device information being acquired through communication with the external device.

11. The information processing device according to claim 1, further comprising:
    the display device including a display screen configured to display at least one of the content image and the notification image.

12. The information processing device according to claim 1,
    wherein the outside information includes distance information indicating a distance related to outside surroundings from the user, and
    wherein the circuitry is further configured to control the display device to display the notification image based on the distance information.

13. The information processing device according to claim 12,
    wherein the circuitry is further configured to control the display device to change a size of the notification image based on the distance information.

14. The information processing device according to claim 1,
    wherein the outside information includes an outside image, and
    wherein the notification image corresponds to at least a part of the outside image.

15. The information processing device according to claim 14,
wherein the circuitry is further configured to control an audio device to output a content sound based on the content information,
wherein the outside information includes an outside sound, and
wherein the circuitry is further configured to replace, based on the determined degree of necessity, the content image and the content sound with the outside image and the outside sound respectively.

16. The information processing device according to claim 1,
wherein the circuitry is further configured to control an audio device to output a content sound based on the content information,
wherein the circuitry is further configured to control, based on the determined degree of necessity, the audio device to output the outside sound instead of the content sound.

17. The information processing device according to claim 1,
wherein the information processing device comprises a head-mounted display, and
wherein the display device is further configured to disable an outside view to transmit through the display device in order to block a field of view of the user entirely when the user wears the information processing device.

18. A notification state control method, implemented via at least one processor, the method comprising:
controlling a display device to display a content image based on content information;
determining, based on outside information indicating an external situation of a user, a degree of necessity that the user be notified of the outside information; and
controlling, based on the determined degree of necessity, the display device to arrange a notification image corresponding to at least part of the external situation at a position of the content image, wherein the position of the content image corresponds to a position of the at least part of the external situation.

19. A non-transitory computer-readable medium having embodied thereon a program, which when executed by a computer, causes the computer to execute a method, the method comprising:
controlling a display device to display a content image based on content information;
determining, based on outside information indicating an external situation of a user, a degree of necessity that the user be notified of the outside information; and
controlling, based on the determined degree of necessity, the display device to arrange a notification image corresponding to at least part of the external situation at a position of the content image, wherein the position of the content image corresponds to a position of the at least part of the external situation.

* * * * *